United States Patent
Pham et al.

(10) Patent No.: US 10,077,610 B2
(45) Date of Patent: Sep. 18, 2018

(54) SYSTEM AND METHOD FOR DELIVERY OF OILFIELD MATERIALS

(71) Applicant: Schlumberger Technology Corporation, Sugar Land, TX (US)

(72) Inventors: Hau Nguyen-Phuc Pham, Houston, TX (US); Rajesh Luharuka, Katy, TX (US); William Bradford Stone, Pearland, TX (US); Nikki Morrison, Houston, TX (US); Jakub Pawel Jodlowski, Houston, TX (US); William Troy Huey, Fulshear, TX (US); Travis Almer, Bossier City, LA (US); Laurent Coquilleau, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 328 days.

(21) Appl. No.: 13/839,088

(22) Filed: Mar. 15, 2013

(65) Prior Publication Data
US 2014/0041319 A1    Feb. 13, 2014

Related U.S. Application Data

(60) Provisional application No. 61/682,734, filed on Aug. 13, 2012, provisional application No. 61/746,154, (Continued)

(51) Int. Cl.
*E21B 15/00* (2006.01)
*E04H 7/22* (2006.01)
(Continued)

(52) U.S. Cl.
CPC .............. *E21B 15/00* (2013.01); *B65G 65/32* (2013.01); *E04H 7/22* (2013.01); *E21B 41/00* (2013.01)

(58) Field of Classification Search
None
See application file for complete search history.

(56) References Cited

U.S. PATENT DOCUMENTS

| 559,965 A | 5/1896 | Bierstadt |
| 896,233 A | 8/1908 | McQueen |
| (Continued) | | |

FOREIGN PATENT DOCUMENTS

| CA | 2552581 C | 2/2009 |
| CA | 2643743 C | 4/2011 |
| (Continued) | | |

OTHER PUBLICATIONS

International Search Report and Written Opinion dated Oct. 24, 2013 for International Patent Application No. PCT/US2013/054294, 10 pages total.

(Continued)

*Primary Examiner* — Abbas Rashid
(74) *Attorney, Agent, or Firm* — Michael L. Flynn; Rachel E. Greene; Robin Nava

(57) ABSTRACT

A system and methodology facilitates the handling of oilfield material. The oilfield material is stored in at least one silo which enables use of gravity to feed the oilfield material to a blender or other suitable equipment. Each modular silo is transportable and may be engaged with a support structure via a pivot connection. Once engaged, the silo is pivoted to a raised, upright position on the support structure. The oilfield material is then moved to an interior of the silo, and gravity may be used to feed the oilfield material to a blender or other equipment in a controlled manner.

21 Claims, 18 Drawing Sheets

Related U.S. Application Data filed on Dec. 27, 2012, provisional application No. 61/746,158, filed on Dec. 27, 2012.

(51) Int. Cl.
*E21B 41/00* (2006.01)
*B65G 65/32* (2006.01)

(56) References Cited

U.S. PATENT DOCUMENTS

| | | |
|---|---|---|
| 1,526,527 A | 2/1925 | Butler |
| 1,576,940 A | 3/1926 | Arthur |
| 2,073,652 A | 3/1937 | Robb |
| 2,099,898 A | 11/1937 | Larkin |
| 2,357,583 A | 9/1944 | Franco |
| 2,774,497 A | 12/1956 | Martin |
| 2,792,262 A | 5/1957 | Hathorn |
| 2,858,950 A | 11/1958 | Martin |
| 3,155,248 A * | 11/1964 | Haller .............. B60P 1/16 414/350 |
| 3,208,616 A | 9/1965 | Haskins |
| 3,263,436 A | 8/1966 | Goldfarb |
| 3,394,961 A | 7/1968 | Gedeon |
| 3,490,632 A | 1/1970 | McKinney |
| 3,618,801 A | 11/1971 | Blanchard |
| 3,666,129 A | 5/1972 | Haskins |
| 3,687,319 A * | 8/1972 | Adam ............... B60P 1/483 414/467 |
| 3,743,108 A | 7/1973 | Visser |
| 3,756,443 A | 9/1973 | Verschage et al. |
| 3,883,019 A | 5/1975 | Hansen, Jr. |
| 3,883,148 A | 5/1975 | Miller |
| 3,894,645 A | 7/1975 | Verschage |
| 3,938,673 A | 2/1976 | Perry, Jr. |
| 3,974,602 A | 8/1976 | Pohl et al. |
| 3,985,254 A * | 10/1976 | Grandury ........... B60P 1/64 414/498 |
| 4,026,441 A | 5/1977 | Jones |
| 4,079,150 A | 3/1978 | Beck et al. |
| 4,090,623 A * | 5/1978 | Noyon ............... B65G 65/23 414/391 |
| 4,103,793 A | 8/1978 | Weaver |
| 4,111,314 A * | 9/1978 | Nelson ............... B65D 88/30 414/787 |
| 4,187,047 A * | 2/1980 | Squifflet, Sr. ....... B60P 3/40 414/332 |
| 4,209,278 A | 6/1980 | Cooper et al. |
| 4,222,498 A | 9/1980 | Brock |
| 4,248,359 A * | 2/1981 | Brock ............... B65G 41/002 222/160 |
| 4,249,848 A * | 2/1981 | Griffin ............... B65D 88/30 414/332 |
| 4,268,208 A * | 5/1981 | Hankins ............. E01C 19/10 414/332 |
| 4,337,014 A | 6/1982 | Farnham |
| 4,348,146 A | 9/1982 | Brock |
| 4,373,857 A | 2/1983 | Giles |
| 4,375,343 A | 3/1983 | Butler |
| 4,400,126 A | 8/1983 | Desourdy |
| 4,427,133 A | 1/1984 | Kierbow et al. |
| 4,465,420 A | 8/1984 | Dillman |
| 4,561,821 A * | 12/1985 | Dillman ............. B65D 88/30 414/332 |
| 4,579,496 A | 4/1986 | Gerlach |
| 4,601,628 A | 7/1986 | Lowing |
| 4,621,972 A | 11/1986 | Grotte |
| 4,626,166 A * | 12/1986 | Jolly ............... B60P 1/64 298/19 R |
| 4,701,095 A | 10/1987 | Berryman et al. |
| 4,775,275 A | 10/1988 | Perry |
| 4,832,561 A | 5/1989 | Nijenhuis |
| 4,850,750 A | 7/1989 | Cogbill et al. |
| 4,855,960 A | 8/1989 | Janssen et al. |
| 4,899,832 A | 2/1990 | Bierscheid |
| 4,907,712 A | 3/1990 | Stempin |
| 4,917,560 A * | 4/1990 | Murray ............... B65D 88/30 414/21 |
| 4,925,358 A | 5/1990 | Cook |
| 4,944,646 A | 7/1990 | Edwards et al. |
| 5,006,034 A | 4/1991 | Bragg et al. |
| 5,018,932 A | 5/1991 | Croisier |
| 5,035,269 A | 7/1991 | Pytryga et al. |
| 5,121,989 A | 6/1992 | Horton et al. |
| 5,195,861 A | 3/1993 | Handke |
| 5,201,498 A | 4/1993 | Akins |
| 5,236,261 A | 8/1993 | Hagenbuch |
| 5,339,996 A | 8/1994 | Dubbert et al. |
| 5,362,193 A | 11/1994 | Milstead |
| 5,387,736 A | 2/1995 | Salomone et al. |
| 5,413,154 A | 5/1995 | Hurst et al. |
| 5,427,497 A | 6/1995 | Dillman |
| 5,667,298 A | 9/1997 | Musil et al. |
| 5,775,713 A | 7/1998 | Peterson et al. |
| 5,777,234 A | 7/1998 | Kosmal |
| 5,785,421 A | 7/1998 | Milek |
| 5,822,930 A | 10/1998 | Klein |
| 6,050,743 A | 4/2000 | Medinger |
| 6,186,195 B1 | 2/2001 | Anstotz |
| 6,186,654 B1 * | 2/2001 | Gunteret, Jr. ...... B01F 5/265 366/18 |
| 6,193,402 B1 | 2/2001 | Grimland et al. |
| 6,286,986 B2 | 9/2001 | Grimland et al. |
| 6,293,689 B1 * | 9/2001 | Guntert, Jr. ........ B28C 9/0418 366/2 |
| 6,447,674 B1 | 9/2002 | Simon et al. |
| 6,474,926 B2 * | 11/2002 | Weiss ............... B28C 7/0495 414/332 |
| 6,527,428 B2 * | 3/2003 | Guntert, Jr. ........ B28C 9/0418 366/2 |
| 6,832,851 B1 | 12/2004 | Von Wilcken |
| 6,939,031 B2 * | 9/2005 | Pham ............... B66F 3/08 248/669 |
| 6,948,535 B2 | 9/2005 | Stegemoeller |
| 7,214,028 B2 * | 5/2007 | Boasso ............... B28C 7/0084 414/812 |
| 7,258,522 B2 | 8/2007 | Pham et al. |
| 7,308,953 B2 | 12/2007 | Barnes |
| 7,614,451 B2 | 11/2009 | Blaschke et al. |
| 7,703,518 B2 | 4/2010 | Phillippi et al. |
| 7,815,222 B2 | 10/2010 | Markham |
| 7,836,949 B2 | 11/2010 | Dykstra |
| 7,837,427 B2 | 11/2010 | Beckel et al. |
| 7,841,394 B2 | 11/2010 | McNeel et al. |
| 7,921,914 B2 | 4/2011 | Bruins et al. |
| 7,926,564 B2 | 4/2011 | Phillippi et al. |
| 7,931,088 B2 | 4/2011 | Stegemoeller et al. |
| 8,083,083 B1 | 12/2011 | Mohns |
| 8,127,844 B2 | 3/2012 | Luharuka et al. |
| 8,137,051 B2 | 3/2012 | Glenn et al. |
| 8,142,134 B2 | 3/2012 | Lavoie et al. |
| 8,146,665 B2 | 4/2012 | Neal |
| 8,313,269 B2 | 11/2012 | Fisher et al. |
| 8,354,602 B2 | 1/2013 | Lucas et al. |
| 8,585,341 B1 | 11/2013 | Oren et al. |
| 8,661,743 B2 | 3/2014 | Flusche |
| 8,726,584 B1 | 5/2014 | Nolte et al. |
| 8,926,252 B2 | 1/2015 | McIver et al. |
| 8,931,996 B2 | 1/2015 | Friesen et al. |
| 9,017,001 B1 | 4/2015 | Dueck |
| 9,097,033 B2 | 8/2015 | Margevicius et al. |
| 2002/0034120 A1 | 3/2002 | Guntert, Jr. et al. |
| 2003/0161212 A1 | 8/2003 | Neal et al. |
| 2003/0202869 A1 * | 10/2003 | Posch ............... B60P 1/6418 414/498 |
| 2005/0091941 A1 | 5/2005 | Baird |
| 2005/0123385 A1 | 6/2005 | Kirsch |
| 2006/0289166 A1 | 12/2006 | Stromquist et al. |
| 2007/0014653 A1 | 1/2007 | Glenn et al. |
| 2007/0179326 A1 | 8/2007 | Baker |
| 2007/0201305 A1 | 8/2007 | Heilman et al. |
| 2008/0066911 A1 | 3/2008 | Luharuka et al. |
| 2008/0073895 A1 | 3/2008 | Herman et al. |

(56) References Cited

U.S. PATENT DOCUMENTS

| | | |
|---|---|---|
| 2008/0179054 A1 | 7/2008 | McGough et al. |
| 2009/0078410 A1 | 3/2009 | Krenek et al. |
| 2010/0038077 A1 | 2/2010 | Heilman et al. |
| 2010/0071284 A1 | 3/2010 | Hagan et al. |
| 2010/0243251 A1 | 9/2010 | Luharuka et al. |
| 2010/0243252 A1 | 9/2010 | Luharuka et al. |
| 2010/0278621 A1* | 11/2010 | Redekop ............... B65D 88/30 414/523 |
| 2010/0329072 A1 | 12/2010 | Hagan et al. |
| 2011/0061855 A1 | 3/2011 | Case et al. |
| 2011/0063942 A1 | 3/2011 | Hagan et al. |
| 2011/0123303 A1 | 5/2011 | Stegemoeller et al. |
| 2011/0127178 A1* | 6/2011 | Claussen ............... B65D 88/26 206/216 |
| 2011/0255941 A1 | 10/2011 | Friesen |
| 2012/0024738 A1 | 2/2012 | Herman et al. |
| 2012/0048537 A1 | 3/2012 | Rettie et al. |
| 2012/0099954 A1 | 4/2012 | Teichrob et al. |
| 2012/0127820 A1 | 5/2012 | Noles, Jr. |
| 2012/0127822 A1 | 5/2012 | Noles, Jr. |
| 2012/0128449 A1 | 5/2012 | Fikes et al. |
| 2012/0134772 A1 | 5/2012 | Herman et al. |
| 2012/0167485 A1 | 7/2012 | Trevithick et al. |
| 2012/0255734 A1 | 10/2012 | Coli et al. |
| 2012/0298210 A1 | 11/2012 | Pham et al. |
| 2013/0105166 A1 | 5/2013 | Medvedev et al. |
| 2013/0309052 A1 | 11/2013 | Luharuka et al. |
| 2014/0041317 A1 | 2/2014 | Pham et al. |
| 2014/0041322 A1 | 2/2014 | Pham et al. |
| 2014/0044508 A1 | 2/2014 | Luharuka et al. |
| 2015/0044003 A1 | 2/2015 | Pham et al. |
| 2015/0044004 A1 | 2/2015 | Pham et al. |
| 2015/0166260 A1 | 6/2015 | Pham et al. |

FOREIGN PATENT DOCUMENTS

| | | |
|---|---|---|
| CN | 2601189 Y | 1/2004 |
| CN | 2693601 Y | 4/2005 |
| CN | 201317413 Y | 9/2009 |
| CN | 201458370 U | 5/2010 |
| CN | 203486442 U | 3/2014 |
| CN | 204109871 U | 1/2015 |
| EP | 2449205 A2 | 5/2012 |
| FR | 2655007 A1 | 5/1991 |
| KR | 100589613 B1 | 6/2006 |
| WO | 2007022300 A3 | 7/2007 |
| WO | 2011061503 A1 | 5/2011 |
| WO | 2011088493 A1 | 7/2011 |
| WO | 2012166590 A1 | 12/2012 |

OTHER PUBLICATIONS

Office Action issued in Chinese Patent Appl. No. 201380048297.2 dated Feb. 1, 2016; 12 pages.

Examination Report issued in Australian Patent Application No. 2013302971 dated Aug. 3, 2016; 3 pages.

Office Action issued in U.S. Appl. No. 13/839,368 dated Sep. 27, 2016; 17 pages.

Office Action issued in Chinese Patent Application No. 201380048297.2 dated Sep. 23, 2016; 17 pages (with English translation).

Examination Report issued in Australian Patent Application No. 2013302969 dated Dec. 8, 2016; 5 pages.

Office Action issued in U.S. Appl. No. 13/839,368 dated Apr. 14, 2017; 19 pages.

Office Action issued in U.S. Appl. No. 13/839,368 dated Aug. 9, 2017; 17 pages.

* cited by examiner

SYSTEM AND METHOD FOR DELIVERY OF OILFIELD MATERIALS

INCORPORATION BY REFERENCE

The provisional patent applications identified by U.S. Ser. No. 61/682,734, filed on Aug. 13, 2012, U.S. Ser. No. 61/746,154, filed on Dec. 27, 2012, and U.S. Ser. No. 61/746,158, filed on Dec. 27, 2012 are hereby incorporated herein by reference in their entirety.

BACKGROUND

To facilitate the recovery of hydrocarbons from oil and gas wells, the subterranean formations surrounding such wells can be hydraulically fractured. Hydraulic fracturing may be used to create cracks in subsurface formations to allow oil and/or gas to move toward the well. The formation is fractured by introducing a specially engineered fluid, sometimes referred to as fracturing fluid or fracturing slurry, at high pressure and high flow rates into the formation through one or more wellbores. The fracturing fluids may be loaded with proppant which are sized particles that may be mixed with the liquids of the fracturing fluid to help form an efficient conduit for production of hydrocarbons from the formation to the wellbore. Proppant may comprise naturally occurring sand grains or gravel, man-made proppants, e.g. fibers or resin coated sand, high-strength ceramic materials, e.g. sintered bauxite, or other suitable materials. The proppant collects heterogeneously or homogeneously inside the fractures to prop open the fractures formed in the formation. Effectively, the proppant creates planes of permeable conduits through which production fluids can flow to the wellbore.

At the well site, proppant and other fracturing fluid components are blended at a low-pressure side of the system. The oilfield materials often are delivered from storage facilities to a blender by pneumatic systems which blow the oilfield materials. Water-based liquid is added and the resulting fracturing fluid is delivered downhole under high pressure. However, handling of the proppant prior to blending tends to create substantial dust as the proppant is moved to the blender via blowers. As a result, dust control devices, e.g. vacuums, are employed in an effort to control the dust. The variety of equipment used in the process also tends to create a large footprint at the well site, and operating the equipment is generally a manually intensive process.

SUMMARY

In general, the present disclosure provides a system and method which facilitate the handling of oilfield materials in a space efficient manner. The oilfield material is stored in at least one silo which may enable use of gravity to feed the oilfield material to a blending system or other suitable equipment. In many applications, the oilfield material is delivered to each silo without blowers. A mobile support structure is disclosed, which receives one or more modular silos at the wellsite. Each modular silo is transportable and may be engaged with a support structure that may be transported to the wellsite separately via a connection that allows for controlled movement of the modular silo during erection. Once engaged, the modular silo may be pivoted to a raised, upright position on the support structure. The oilfield material is then moved to an interior of the silo, and gravity may be used to feed the oilfield material to a blender or other equipment in a controlled manner. However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
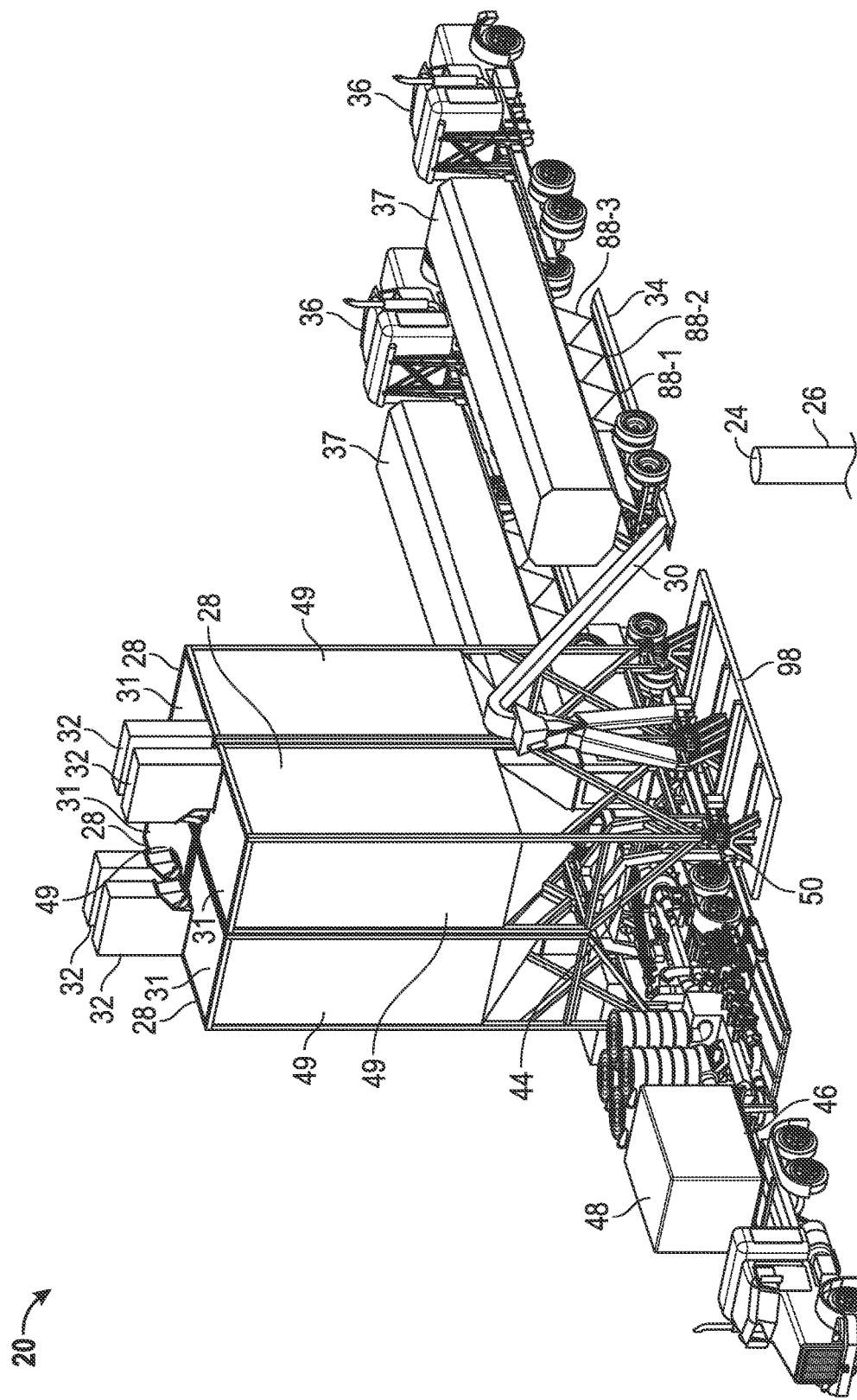
FIG. 1 is an illustration of an example of a proppant delivery system positioned at a well site, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Finally, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The present disclosure generally involves a system and methodology to facilitate handling of oilfield materials in a space efficient manner. In one embodiment, the oilfield materials may be carried to a wellsite by suitable trucks and loaded into at least one modular silo without using air to carry the oilfield material. By way of example, the oilfield materials may be moved into a plurality of modular silos by using vertical conveyors to move the oilfield material without blowers. In some embodiments, each modular silo comprises an outer housing defining an enclosed interior for receiving the oilfield material. A corresponding vertical conveyor is positioned within the enclosed interior and is used to lift the oilfield material from a silo inlet, e.g. a hopper, to an upper portion of the modular silo without utilizing airflow to carry the oilfield materials. Once the oilfield material is disposed within the upright modular silo, the outflow of oilfield material through a silo outlet may be gravity controlled so as to selectively release the desired amount of material into a blending system or other suitable equipment positioned underneath the modular silo.

According to an example, a vertical silo is designed as a modular silo which may be carried to the well site by an over-the-road truck before being mounted in a generally upright position on the support structure. Truck refers to a transport vehicle, such as an articulated truck having a trailer pulled by a tractor. In this example, the modular silo is carried by the trailer of the truck. However, the truck also may comprise a straight truck or other suitable truck designed to carry the modular silo and to transport the modular silo over public roadways. The support structure may be designed in a manner which allows the silo to be erected from its lateral position on the truck to an upright, e.g. vertical, position at the well site. However, it should be understood that in other embodiments, a crane may be used to lift the modular silo and place the modular silo onto a support structure. The use of upright silos provides an efficient solution for proppant delivery in many applications. Gravity effectively causes the oilfield material to flow downwardly to desired equipment, such as a blending system.

The support structure may be designed in a variety of forms and configurations to support individual modular silos or a plurality of modular silos. By way of example, the support structure may be constructed of struts arranged in an A-frame configuration or other type of configuration able to support and secure the at least one modular silo in the desired upright position. In at least some applications, the support structure is designed to engage each modular silo while the modular silo is positioned on the transport truck. This allows the modular silo to be pivoted upwardly directly from the truck to its operational, upright position. The support structure also may be constructed to support each modular silo at a sufficient height to enable oilfield material to be gravity fed through a bottom end feeder and into a portable blender positioned below. In some applications, load cells are incorporated into the support structure to monitor the loading caused by each modular silo which enables tracking of the amount of oilfield material in each modular silo. In one embodiment, the support structure is a mobile support structure implemented as a trailer having wheels and a gooseneck portion for connection to the truck. In this embodiment, the gooseneck portion may convert to a ramp to aid in positioning a blending system underneath the modular silos. In another embodiment, the blending system may be integrated on the deck of the mobile support structure.

Figure 5:
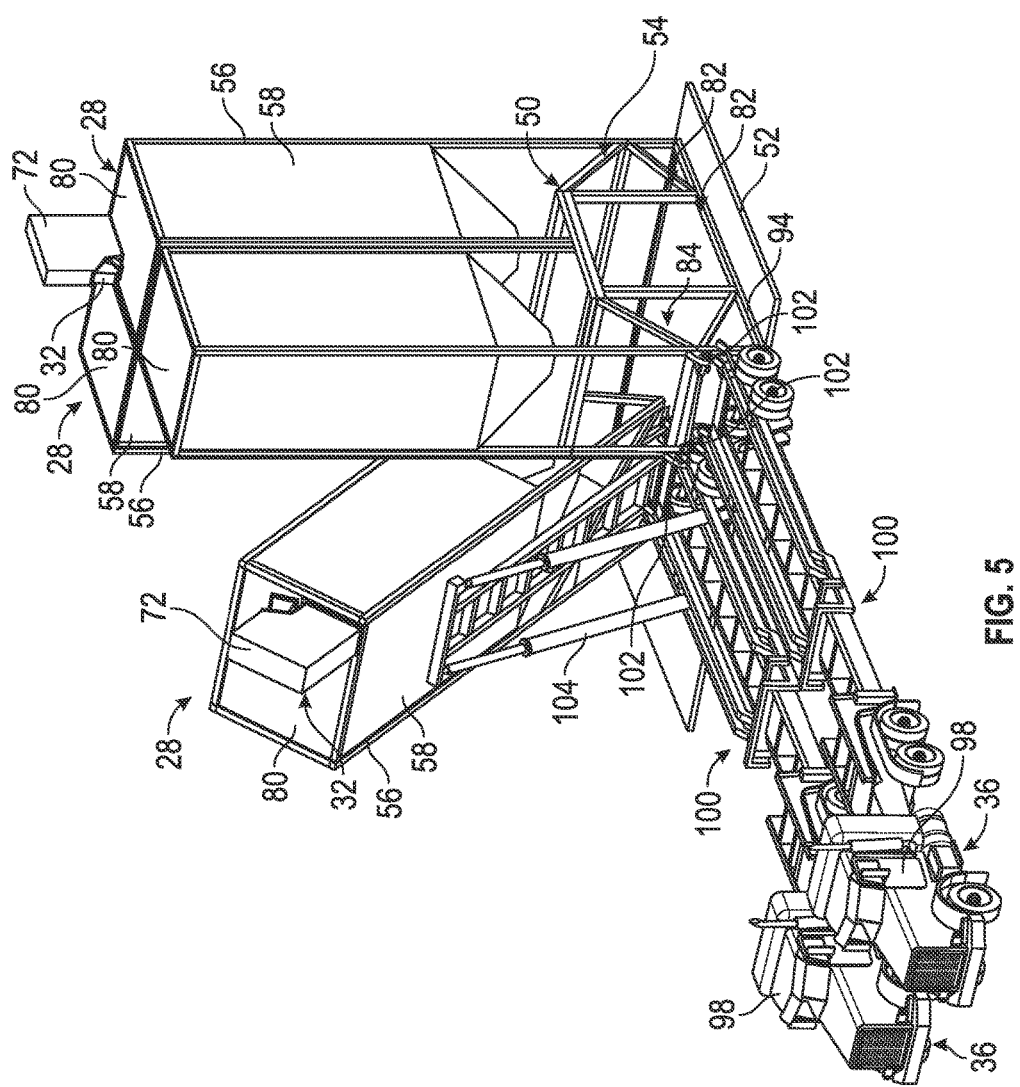
FIG. 5 is an illustration of a plurality of modular silos transported by over-the-road trucks and erected into position on the support structure, according to an embodiment of the disclosure.

In some embodiments, a conveyor, such as a mechanical belt conveyor, may be utilized to move oilfield material unloaded from a gravity dump transport into an intake hopper of a vertical conveyor enclosed within the modular silo. The mechanical belt conveyor can be backed over by a trailer hauling the oilfield material with multiple nozzles overlapping the mechanical belt conveyor, or other types of haulers may be used, such as tail dumps and live bottom trailers. By way of example, the vertical conveyor may comprise a bucket elevator or other type of vertical conveyor capable of conveying the oilfield material to an upper end of the modular silo a substantial distance, e.g. 30 to 70 feet, above the well site surface. The conveyor moving the oilfield material to the silo and the vertical conveyor may be enclosed to provide a dust free solution for handling oilfield material at much higher rates with greater energy efficiency and lower attrition than that achieved with existing pneumatic, e.g. blower, type conveyance systems. To increase storage capacity of the modular silo as compared to a cylindrical silo, the outer housing may have a substantially rectangular shape defining four corners (which may form pointed vertices or be rounded). The modular silo may be transported on a trailer having a gooseneck. As best shown in FIG. 5, to further increase the storage capacity of the modular silo while still being capable of being transported by a truck, the vertical conveyor may extend beyond a top of the outer housing and be offset towards one of the corners so as to avoid the gooseneck of the trailer.

Depending on the parameters of a given fracturing process, a plurality of the modular silos may be grouped together so that feeders of the plurality of modular silos provide oilfield material to a common area, e.g. to a truck mounted blending system having a proppant metering/rate control system, or other portable blender or blending system positioned beneath the modular silos. In order to reduce the space required at the wellsite for the plurality of the modular silos, the common area may be located below the outer housings of the modular silos. In this example, the outer housings of the modular silos overlap the common area. Additionally, some or all of the modular silos may be divided into compartments. In some applications, individual modular silos may have a plurality of internal compartments for holding different types of oilfield materials. Individual silos also may be divided into main storage compartments and secondary storage compartments located below the main storage compartments. In the latter example, the main storage compartment may be used to gravity feed oilfield material to an outlet feeder for distribution into the blending system. Some systems may utilize a belt feeder or other type of feeder system instead of gravity feed. The secondary storage compartment may be exposed to the internal vertical conveyor and proppant from the secondary storage compartment may continually be lifted and discharged into the main storage compartment. In some applications, the secondary compartments or other compartments of the modular silo may have separate features which enable independent filling of those particular compartments. Additionally, outlet feeders may be designed with controllable mechanisms, e.g. gates, which are adjustable to control the outflow of oilfield material.

The modular silos may be designed in a variety of sizes and shapes, including cylindrical shapes or rectangular shapes, selected to enable transport via a suitable over-the-road truck. By way of example, the modular silos may vary in size according to the proppant delivery plan for a given fracturing operation, but an example of a suitable modular silo may hold 2000-4000 cubic feet of oilfield material. In some systems, the modular silos are provided with sufficient clearance on the bottom side to form an unobstructed passage to enable a portable blending system, such as a truck mounted blending system, to be driven under a system of combined modular silos to receive oilfield material via gravity feed. For example, the portable blending system may be mounted on a truck trailer which is backed into position under the outlet feeders of a plurality of modular silos. In some embodiments, the modular silos may be designed as standalone silos and in other embodiments, the modular silos may be designed for placement on a framework/support structure which supports the modular silos at a desired height. In one embodiment the blending system may be skid mounted in order to be transported on a trailer to the wellsite and then placed under the silo system by a suitable mechanical device, such as a winch.

Each of these embodiments may utilize an enclosed, vertical conveyor to avoid blowing of the oilfield material, although in other embodiments a pneumatic fill tube can be used as a vertical conveyor. Each modular silo also may be filled by an integrated, oilfield material loading and delivery system utilizing an enclosed conveyor or other suitable system for moving oilfield material from an unload area to an inlet associated with the vertical conveyor at a lower end of the modular silo. In some applications, the vertical conveyor may be powered by a belt or other device driven by the enclosed conveyor system used to move oilfield material from the unload area to the inlet of the modular silo. This allows the system to be substantially automated. However, the individual motive systems, e.g., vertical conveyor and enclosed conveyor extending from the unload area, may be powered individually or collectively by a variety of sources, including various motors, engines, or other devices.

Referring generally to FIG. 1, an embodiment of a proppant delivery system for forming a slurry suitable for fracturing formations, is illustrated in position at a well site. By way of example, the proppant delivery system may comprise many types of equipment, including vehicles, storage containers, material handling equipment, pumps, control systems, and other equipment designed to facilitate the fracturing process.

In the example of FIG. 1, a proppant delivery system 20 is illustrated in position at a wellsite 22 having a well 24 with at least one wellbore 26 extending down into a reservoir/formation. The proppant delivery system 20 may comprise many types and arrangements of equipment, and the types or arrangements may vary from one fracturing operation to another. By way of example, the proppant delivery system 20 may comprise at least one modular silo 28, e.g. a plurality of modular silos that may be transported over-the-road by trucks able to operate on public roadways. The modular silos 28 are designed to store oilfield material such as a proppant used to prop open fractures upon fracturing of the subterranean formation, or guar used to increase the viscosity of a hydraulic fracturing fluid. In the example illustrated, several modular silos 28 receive oilfield material via conveyors 30, e.g. belt conveyors, and the oilfield material is lifted to an upper portion 31 of each modular silo 28 by corresponding vertical conveyors 32. The conveyors 30 and the vertical conveyors 32 may operate by carrying the oilfield material instead of blowing the oilfield material to avoid erosion of components and dusting of the area. Additionally, the conveyors 30 and vertical conveyors 32 may be enclosed to further reduce dust as the oilfield material is delivered from an unload area 34 and into the modular silos 28.

As illustrated, oilfield material transport trucks 36 may be used to deliver oilfield material to the unload area 34. In this example, the trucks 36 are tractor-trailer trucks having trailers 37 which may be backed over a portion of a selected conveyor 30. The trailers 37 can be gravity feed trailers or other types of trailers capable of moving the oilfield material to the wellsite 22. The trailers may be operated to release the oilfield material onto a belt or other suitable carrier of the selected conveyor 30 for transfer to the associated modular silo or silos 28 along an enclosed pathway within the conveyor 30.

In this example, the proppant delivery system 20 may comprise a variety of other components including water tanks (not shown) for supplying water that is mixed with the oilfield material to form the hydraulic fracturing fluid, e.g. proppant slurry, that may be pumped downhole into wellbore 26 via a plurality of pumps (not shown). By way of example, pumps may be truck mounted pumps, e.g. pumping systems mounted on truck trailers designed for over-the-road transport. The multiple pumps may be coupled to a common manifold (not shown) designed to deliver the hydraulic fracturing fluid to the wellbore 26. The proppant delivery system 20 also may comprise a blending system 44 designed to blend oilfield material delivered from modular silos 28. By way of example, the blending system 44 may be a portable blender, such as a truck mounted blender or a skid mounted blender. In the specific example illustrated, blending system 44 is mounted on a truck trailer 46 that may be driven, e.g. backed up, into a common area 47 (shown in FIG. 3) that is positioned underneath or proximate to the modular silos 28. The proppant delivery system 20 also may comprise a variety of other components, such as a control facility 48 and/or other components designed to facilitate a given fracturing operation. In one embodiment, the common area 47 is located below the outer housings 49 of the modular silos 28. In this embodiment, the outer housings 49 of the modular silos 28 overlap the common area 47.

Figure 2:
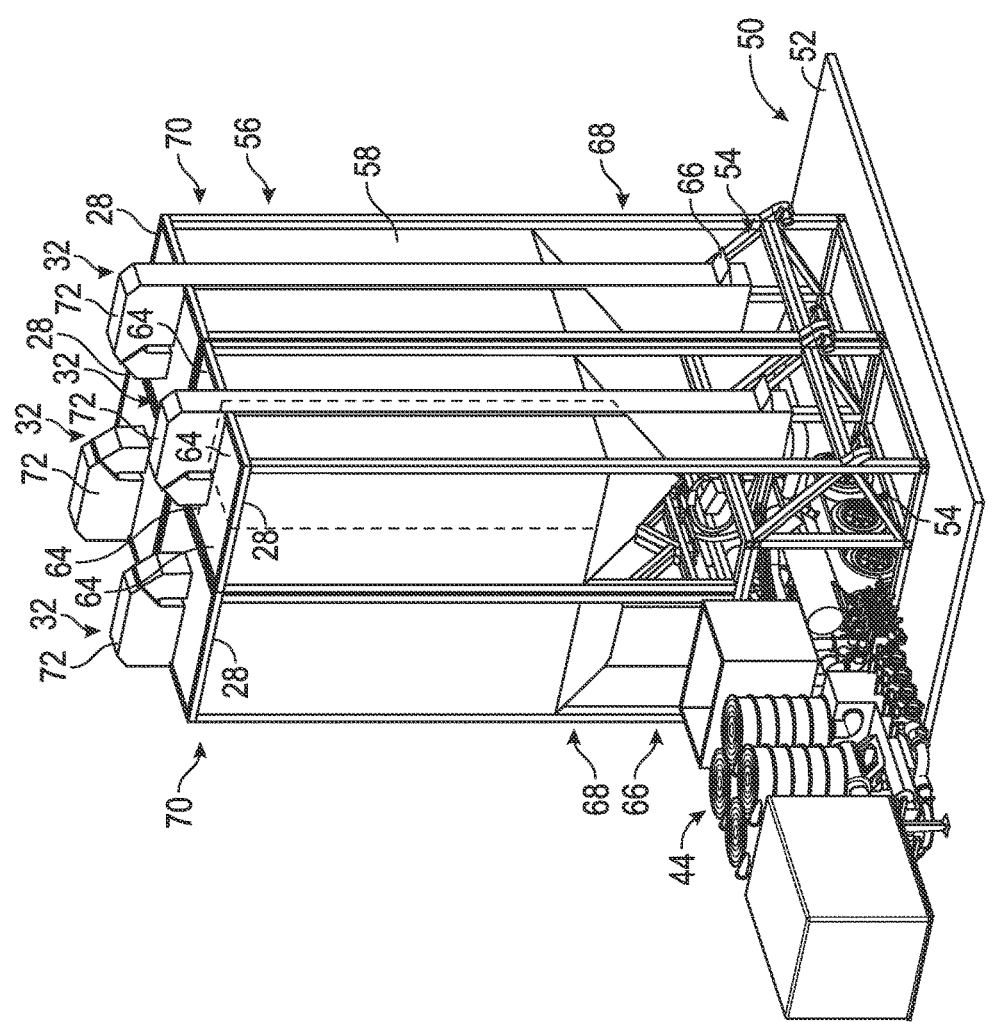
FIG. 2 is an illustration of another embodiment of a proppant delivery system in which a plurality of closed, modular silos are used for holding oilfield materials, according to an embodiment of the disclosure.

Referring generally to FIG. 2, an embodiment of modular silos 28 coupled together into a cooperating unit is illustrated. In this example, a plurality of the modular silos 28, e.g. four modular silos 28, is coupled together on a modular support structure, or framework, 50 which may be mounted on a mat system 52 which may be placed upon a pad, such as a concrete pad, gravel or the like. The mat system 52 distributes the load from the modular silos 28 onto the ground. The modular silos 28 may be releasably mounted in a generally upright or vertical orientation on support structure 50. Support structure 50 is constructed with a plurality of silo receiving regions 54 on which the individual modular silos 28 may be mounted in a generally upright or vertical orientation. The support structure 50 and the silo receiving regions 54 may be designed to elevate the modular silos 28 to a sufficient height so as to allow movement of portable blending system 44 to a position sufficiently beneath the modular silos 28 within the common area 47 in order to receive a controlled outflow of oilfield material. For example, the support structure 50 may be designed to allow a truck mounted blending system 44 to be driven, e.g. backed up, into position beneath the modular silos 28, as illustrated. Additionally, the pad may be constructed in a variety of sizes and forms, including cement pads, compacted aggregate pads, pads constructed as portable structures, mixtures of these various structural elements, and/or other suitable pad types for supporting the plurality of modular silos 28.

Figure 3:
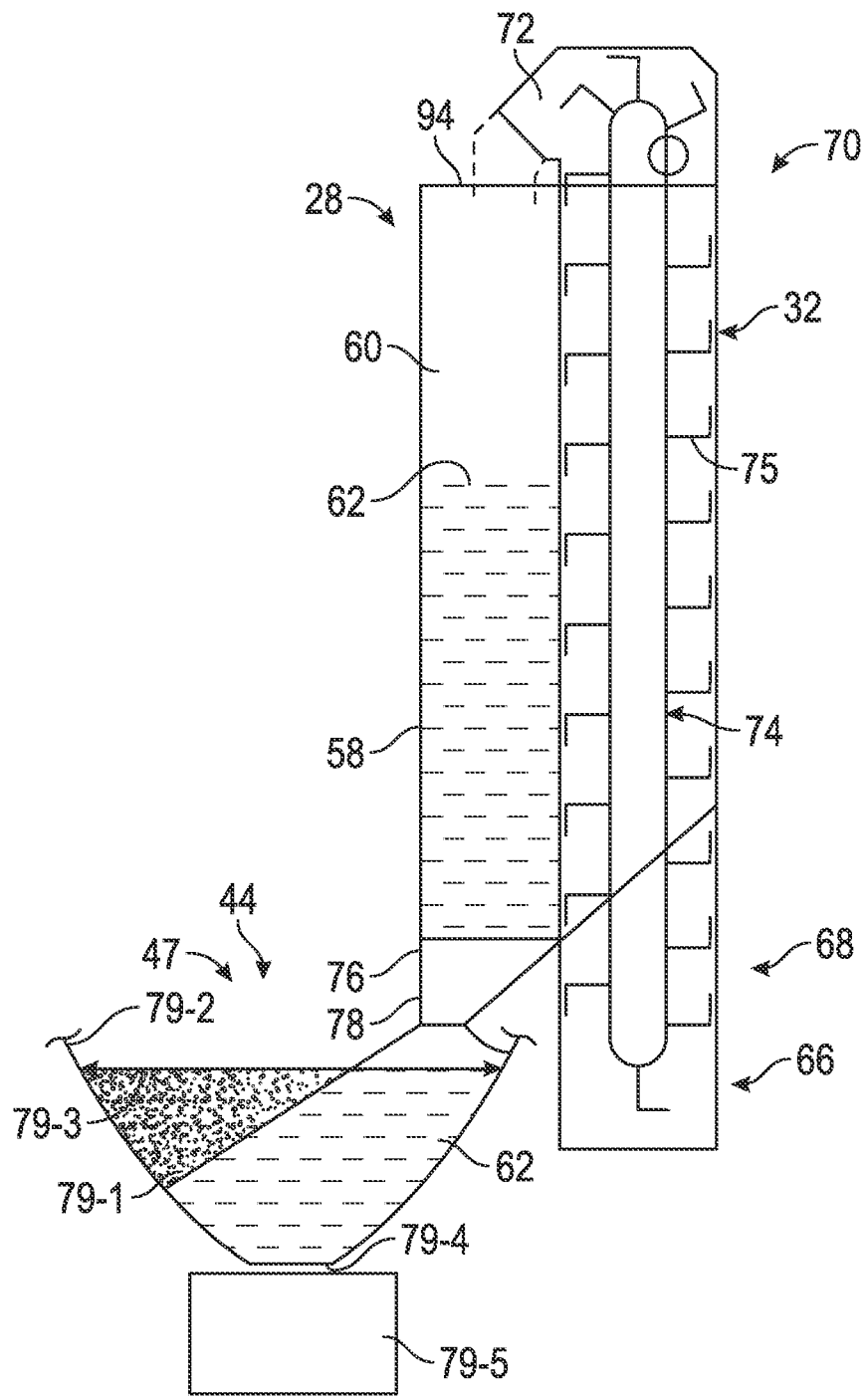
FIG. 3 is a schematic illustration of an example of a vertical conveyor system enclosed within a silo, according to an embodiment of the disclosure.

In the example illustrated, modular silos 28 each may be constructed with a silo frame 56 supporting the outer housing 49 which defines an enclosed interior 60 for holding oilfield material 62 (see also FIG. 3). Depending on the fracturing operation, oilfield material 62 may comprise naturally occurring sand grains or gravel, man-made proppants, resin coated sand, high-strength ceramic materials, e.g. sintered bauxite, other solids such as fibers, mica, mixtures of different sized oilfield materials, mixtures of different types of oilfield materials, and/or other suitable oilfield materials. In some applications, selected modular silos 28 or each of the modular silos 28 may be divided into the compartments 64 designed to hold different types of oilfield materials 62 that may be selectively released from the modular silo 28 and blended via the blending system 44. Each enclosed vertical conveyor 32 is designed to lift oilfield material (e.g., with or without blowing) from an inlet 66, e.g. an inlet hopper, disposed at a lower portion 68 to an upper discharge portion 70 for release into enclosed interior 60 through a vertical conveyor head 72. In some embodiments, the conveyor head 72 may have a pivotable or otherwise movable discharge which is selectively controllable to deliver the desired oilfield material to a corresponding desired compartment 64 within a given modular silo 28.

With further reference to FIG. 3, the vertical conveyor 32 may be positioned within enclosed interior 60 in a manner which limits escape of dust while providing a uniform modular unit that may be readily transported via an over-the-road truck, such as truck 36 with a suitably designed trailer. Vertical conveyor 32 also may be constructed in a variety of forms. For example, the vertical conveyor 32 may be constructed as a bucket elevator 74 having a plurality of buckets 75 conveyed in a continuous loop lifting oilfield material 62 from inlet 66 to upper discharge portion 70 for discharge into enclosed interior 60 via vertical conveyor head 72. The outflow of oilfield material 62 to the blending system 44 may be through an outlet, e.g. a feeder 76, and the amount of outflow through feeder 76 may be controlled by a suitable outflow control mechanism 78. For example, the blending system 44 may include a hopper 79-1 having an inlet 79-2 positioned below the feeder 76. In one embodiment, the outer housing 58 overlaps the inlet 79-2 of the hopper 79-1. The inlet 79-2 of the hopper 79-1 may have a width 79-3 up to 12 feet, and desirably between 8 feet to 8.5 feet. The hopper 79-1 may also have an outflow control mechanism 79-4 which is similar to the outflow control mechanism 78. By way of example, outflow control mechanisms 78 and 79-4 may comprise a controllable gate, e.g. hydraulic gate, control valve, or other flow control mechanism which is operated via control facility 48 or via another suitable control system. In this example, oilfield material 62 is gravity fed through feeder 76 and the amount of outflow is governed by the outflow control mechanism 78. In one embodiment, the amount of oilfield material 62 discharged into a blender 79-5 of the blending system 44 may be regulated by both of the outflow control mechanisms 78 and 79-4. In this instance, the outflow control mechanism 79-4 may be maintained in a fixed open position while the outflow control mechanism 78 is regulated in real-time by the control facility 48 to control an amount of oilfield material 62 discharged into the blender 79-5. Because the feeder 76 is within the confines of the hopper 79-1, as the hopper 79-1 fills with oilfield material 62, the oilfield material 62 will bear against the feeder 76 and form a plug. In this manner, the outflow control mechanism 79-4 is self-regulating and the outflow control mechanism 78 and the control facility 48 may solely control the amount of oilfield material 62 discharged into the blender 79-5.

Figure 4:
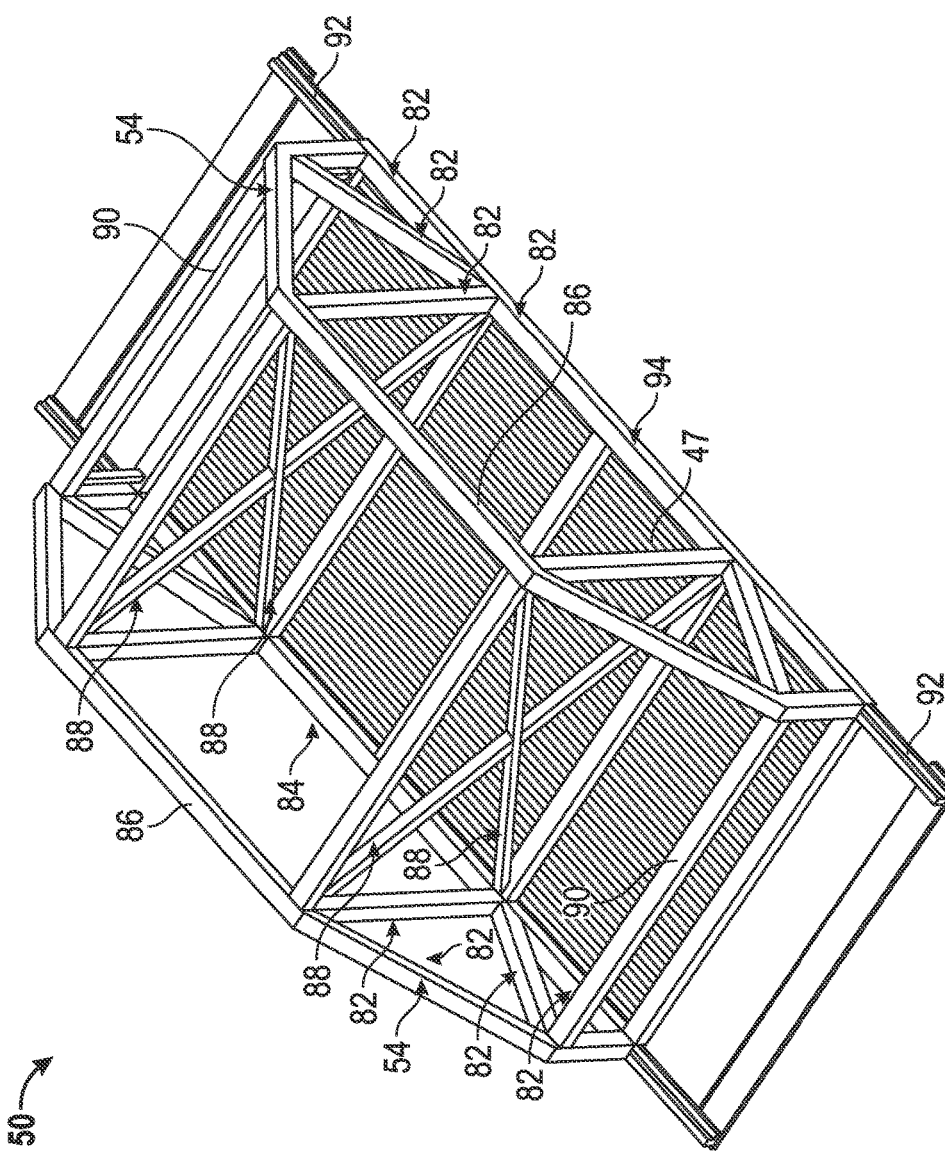
FIG. 4 is an illustration of an example of a support structure with silo receiving areas on which modular silos may be mounted in an upright orientation, according to an embodiment of the disclosure.

Referring generally to FIG. 4, an example of support structure 50 is illustrated. In this example, the support structure 50 comprises a plurality of struts 82 which are connected by suitable fastening methods to create a strong, stable structure for supporting at least one modular silo 28. Fastening methods may utilize welds, bolt and nut fasteners, and/or other suitable types of fasteners. The struts 82 are connected to form at least one silo receiving region 54. In the example illustrated, struts 82 are arranged to create a plurality of the silo receiving regions 54 designed to receive and support, for example, two modular silos 28. However, support structure 50 may be constructed in a variety of configurations for supporting various numbers of modular silos 28 in many types of arrangements and configurations.

In the embodiment illustrated, struts 82 also are arranged to create support structure 50 with a drive under region or passage 84 which provides space for system equipment, such as portable blending system 44 as well as encompasses the common area 47. By way of example, support structure 50 may be arranged so that silo receiving regions 54 are able to support modular silos 28 via silo frames 56 at a raised position which allows bottom feeders 76 to meter the outflow of oilfield material 62 down into the portable blending system 44 when the portable blending system 44 is positioned and/or driven into the passage 84. As illustrated, upper struts 86 may be used to connect silo receiving regions 54 and to provide an upper support for a portion of the modular silo frames 56. The upper struts 86 may be placed at a sufficient height to enable a truck mounted portable blending system 44 to be driven, e.g. backed up, into drive under region or passage 84 for receiving oilfield material 62 from the modular silos 28. In other embodiments, however, the upper struts 86 may be split and supported by additional vertical struts to allow separation of the silo receiving regions 54. The separation of silo receiving regions 54 allows individual silos 28 or groups of silos 28 to be separated and to provide a space through which equipment, e.g. the portable blending system 44, may be driven between the separated modular silos 28.

Support structure 50 also may comprise a variety of additional features, including strengthening cross struts 88 which may be positioned at various locations throughout the structure of support structure 50 to enhance the strength of the support structure. The support structure 50 also may comprise pivot struts 90 to which pivot connectors (shown in FIG. 6) may be attached, as discussed in greater detail below. The pivot struts 90 provide a strong region of the support structure 50 to which each modular silo 28 may initially be engaged and then pivoted against during erection of each modular silo 28 from a lateral position to an upright, operational position. In some applications, the pivot struts 90 are located at a height which matches corresponding pivot connectors of the modular silo frame 56 when the modular silo 28 is mounted laterally, e.g. horizontally, on a suitable over-the-road truck 36.

Referring again to FIG. 4, support structure 50 also may comprise or be connected with at least one expandable base 92 designed to stabilize the support structure 50 and the modular silos 28 when mounted in an upright position on the support structure 50. In the example illustrated, a plurality of expandable bases 92 are movably connected with a base portion 94 of support structure 50. The expandable bases 92 may be slidably received in base portion 94 for movement between a retracted position in base portion 94 and an extended position, as illustrated, to provide greater stability to the support structure 50. The extension and contraction of expandable bases 92 may be performed by a variety of suitable actuators, including hydraulic actuators, e.g. hydraulic cylinders, electric actuators, e.g. stepping motors which operate a screw coupled to the expandable bases, and/or mechanical actuators, e.g. expandable bases which may be manually transitioned between positions. Additionally, transition of the expandable bases 92 between retracted and actuated positions may be facilitated by a variety of other types of moveable joints, including hinges and other types of pivots, couplers which enable quick connection and disconnection of the expandable bases 92, and/or other suitable mechanisms. The number and orientation of expandable bases 92 also may be adjusted according to the parameters of a given application. The expandable bases 92 may be connected with the support structure 50 so as to provide a seismic base isolation to the support structure 50. The expandable bases 92 may include additional slideable or foldable outriggers connected at a side of the expandable base 92 to further stabilize the support structure 50.

In FIG. 5, an example is illustrated in which a plurality of modular silos 28 are being placed into position on two of the support structures 50 positioned side-by-side. In this example, each individual modular silo 28 is transported to the well site 22 by a suitable truck 36. As illustrated, the suitable truck 36 may comprise a tractor 98 pulling a trailer 100 appropriately sized to receive one of the silos 28 in a lateral, e.g. horizontal, orientation. In the example illustrated, the modular silo 28 is constructed such that vertical conveyor head 72 extends from closed top 80 of silo housing 58 generally along a side of the modular silo 28. This enables transport of the modular silo 28 on a conventional gooseneck style trailer 92, as illustrated.

Each truck 36 may be backed up to move the laterally positioned silo 28 into engagement with a corresponding silo receiving region 54 of support structure 50. As discussed above, the support structure 50 may comprise pivot struts 90 or other suitable structures located at an appropriate height to receive and engage each modular silo 28 when in the lateral position on truck 36. By way of example, the support structure 50 and the corresponding modular silos 28 may use pivot connectors 102 by which the silo 28 may be selectively engaged with the support structure 50. The pivot connectors 102 are positioned to allow engagement and connection of each silo 28 with the support structure 50 while the silo 28 is in a lateral position on truck 36. The pivot connectors 102 also are designed to maintain engagement of the modular silo 28 with the support structure 50 as the silo is pivoted from the lateral position to an operational upright, e.g. vertical, orientation.

The modular silos 28 may be pivoted or moved about pivot connectors 102 from the lateral position on truck 36 to the operational, upright position on the support structure 50 by a variety of mechanisms. For example, a ram 104 (shown in dashed lines) may be used to erect each silo 28 between the lateral and upright positions. The ram 104 may be a hydraulic or pneumatic ram positioned on trailer 100 to act against frame 56 of each modular silo 28 to pivot the modular silo 28 about pivot connectors 102 until the silo 28 is securely received in its upright position by silo receiving region 54. The ram 104 may be designed to operate off a hydraulic (or pneumatic) system of truck 36. In other applications, the ram 104 may be designed to pivot trailer 100 or a portion of trailer 100 upwardly while the modular silo 28 remains attached to the pivoting portion of the trailer 100. Other techniques may utilize cranes, pulleys, and/or other mechanisms to pivot each modular silo 28 about the pivot connection as the modular silo 28 is transitioned from the lateral position to the operational, upright orientation.

Figure 6:
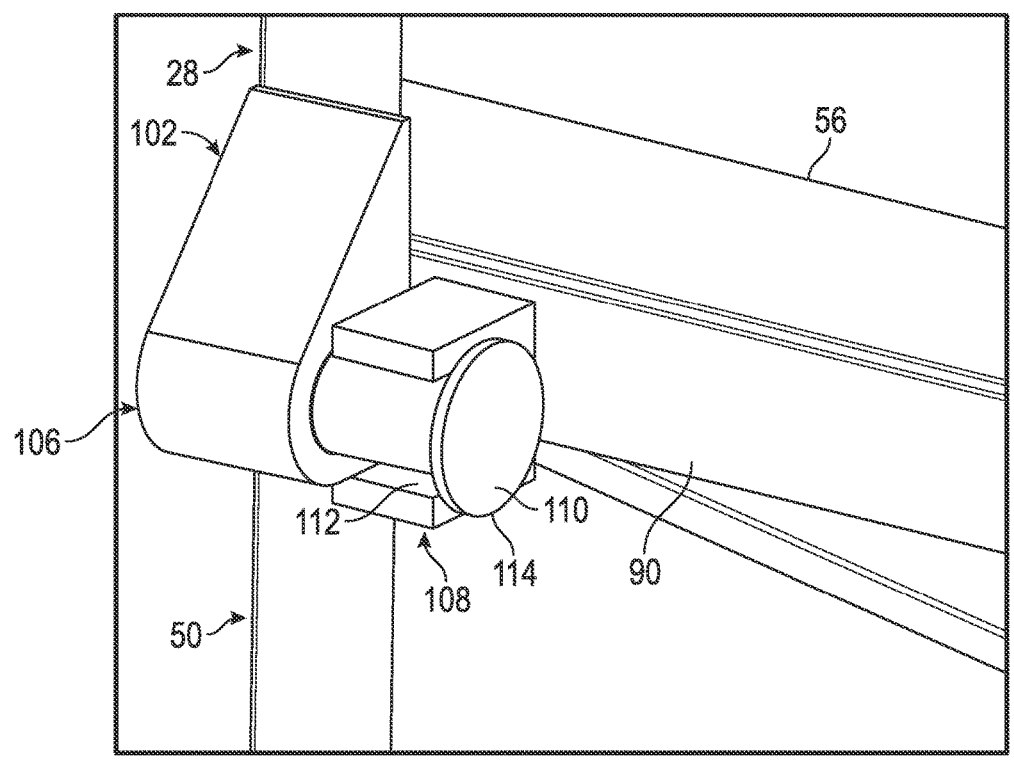
FIG. 6 is an illustration of an example of a pivot connection used in pivoting a modular silo from a lateral position to an upright position on the support structure, according to an embodiment of the disclosure.

The pivot connectors 102 are used to facilitate formation of the pivot connection between each modular silo 28 and the support structure 50 and may comprise a variety of individual or plural connector mechanisms. Generally, each pivot connector 102 comprises a pivot member 106 mounted to the silo 28 and a corresponding pivot member 108 mounted on the support structure 50, e.g. mounted on pivot struts 90, as illustrated in FIG. 6. In the specific example illustrated in FIGS. 5 and 6, each modular silo 28 is pivotably engaged with support structure 50 via a pair of the pivot connectors 102. By way of example, each pivot member 106 may comprise a pin 110 rotatably, e.g. pivotably, received in a corresponding pin receiver 112 which forms part of corresponding pivot member 108. Although pin 110 is illustrated as connected to frame 56 of modular silo 28 and pin receiver 112 is illustrated as connected to pivot struts 90 of support structure 50, the pin 110 and pin receiver 112 can be reversed. Additionally, the pivot connectors 102 may comprise a variety of other structures designed to enable selective engagement of the modular silos 28 with support structure 50 and controlled movement of the modular silos 28 with respect to the support structure 50. Depending on the design of the pivot connectors 102, a variety of retention features such as expanded pin head 114 may be used to maintain the pivotable connection between the modular silo 28 and support structure 50 during transition of the modular silo 28 from the lateral position to the upright position.

Figure 7:
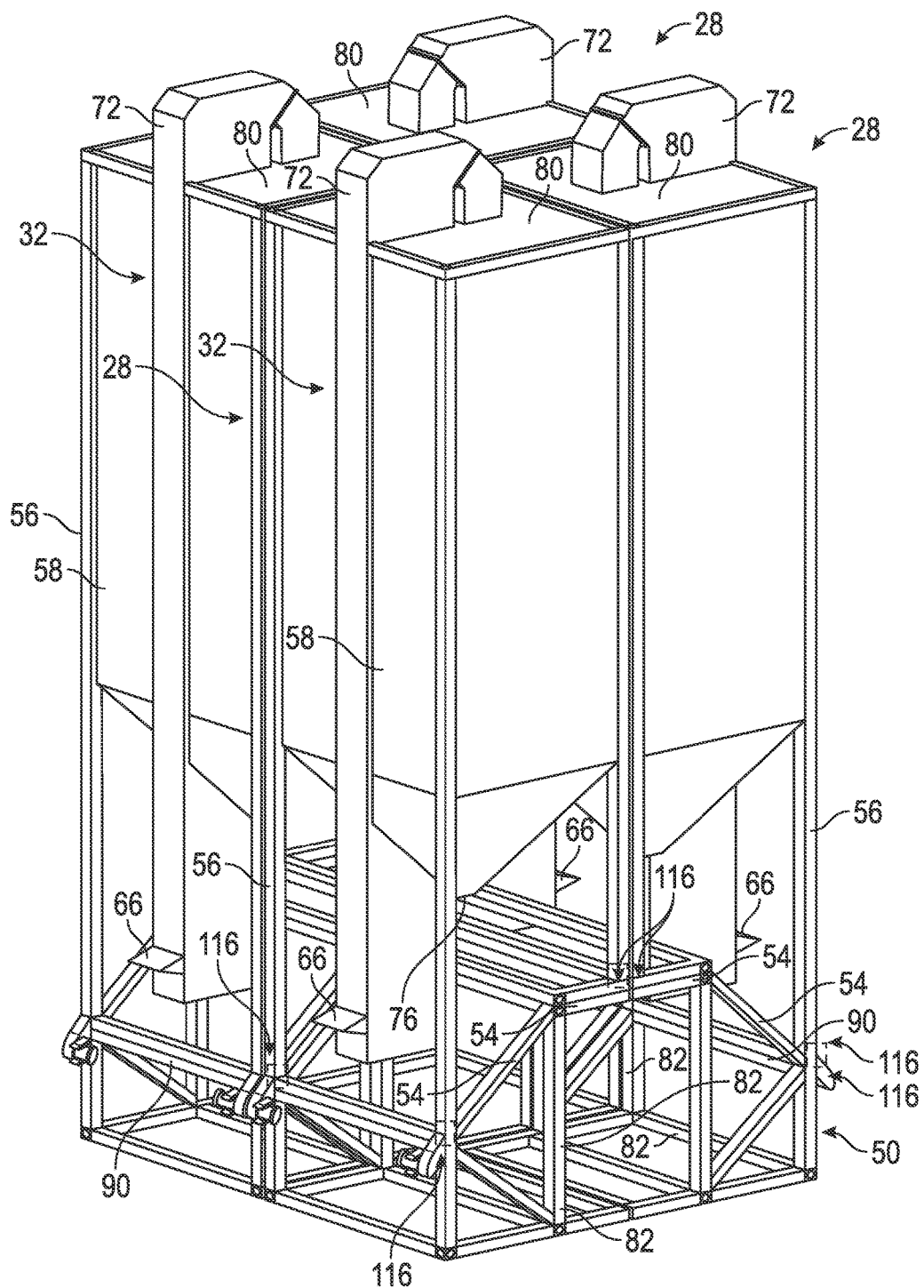
FIG. 7 is an illustration of a plurality of the modular silos positioned on the support structure with load cells mounted in appropriate locations to monitor the load, and thus the content weight, of each modular silo, according to an embodiment of the disclosure.

Referring generally to FIG. 7, the support structure 50 and/or modular silos 28 may comprise other features for detecting and/or monitoring certain system functions. For example, various sensors 116 may be positioned on support structure 50 and/or on modular silos 28 to detect and/or monitor parameters related to the delivery of oilfield material 62 for a given fracturing operation. By way of example, sensors 116 may comprise load cells mounted at silo receiving regions 54 to monitor the loads applied by individual modular silos 28. The loading data may be used to track the amount of oilfield material that remains in enclosed interior 60 of each modular silo 28.

Figure 8:
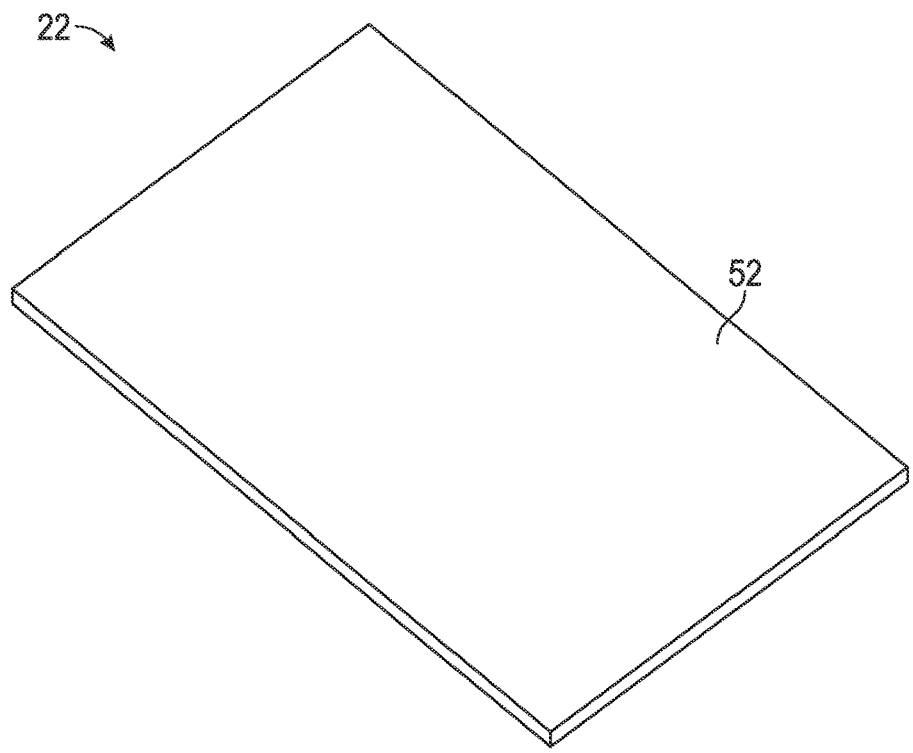
FIG. 8 is an illustration of an example of a mat system on which the support structure may be mounted at a well site, according to an embodiment of the disclosure.

In FIGS. 5, 7, 8 and 9, an operational example is illustrated to facilitate explanation of how an embodiment of the proppant delivery system may be constructed at a given wellsite 22. In this example, the mat system 52 is initially constructed at well site 22 as shown in FIG. 8. The mat system 52 52 may be constructed in a variety of sizes and forms depending on the environment and on the size and parameters of a given fracturing operation. By way of example, the mat system 52 may comprise of a structural material formed of steel or another suitable structural material, and positioned on the pad to distribute the weight of the modular silos 28 to the ground, as illustrated in FIG. 8.

Figure 9:
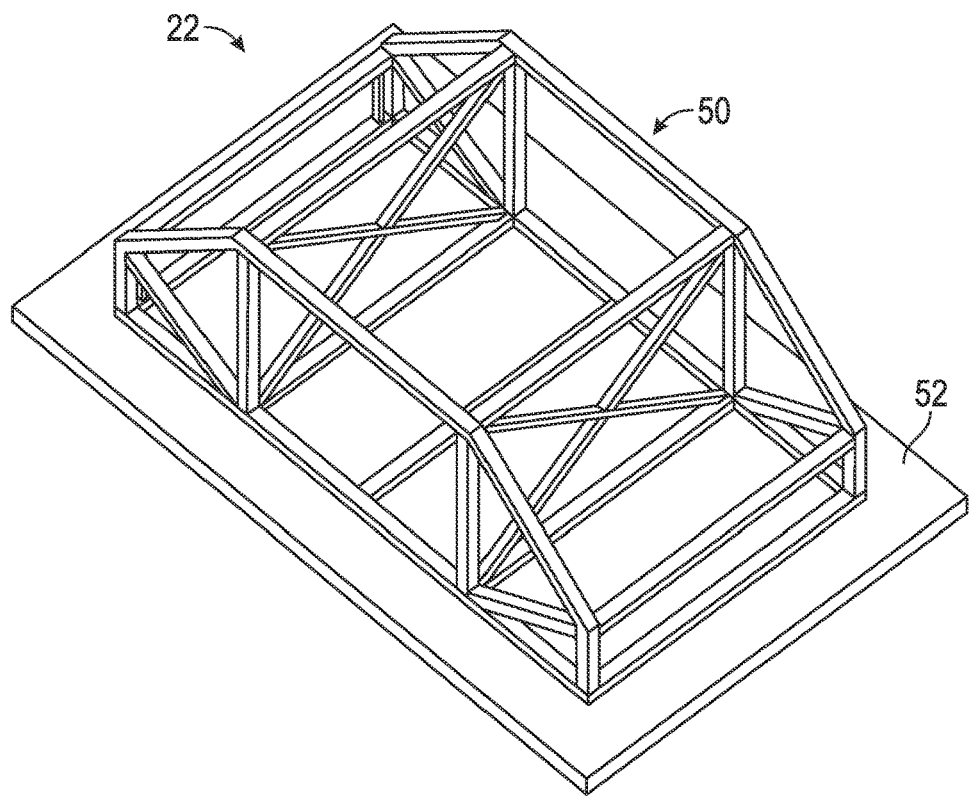
FIG. 9 is an illustration of an example of the support structure positioned on the mat system illustrated in FIG. 8, according to an embodiment of the disclosure.

Once the mat system 52 is in place, at least one support structure 50 may be assembled and/or positioned on the mat system 52, as illustrated in FIG. 9. The support structure 50 is oriented for receipt of modular silos 28 in a desired orientation at well site 22. In the specific example illustrated, the support structure 50 is constructed and positioned to receive a plurality of the modular silos 28, e.g. two, three or four modular silos 28. After the support structure 50 is properly positioned, trucks 36 are used to deliver modular silos 28. In one embodiment, the mat system 52 may be integrated into a base of the support structure 50.

As illustrated in FIG. 5, for example, an individual modular silo 28 may be mounted in a horizontal position on trailer 100 of truck 36. As discussed above, each modular silo 28 may be designed as a modular unit used alone or in cooperation with other silos 28. The modularity along with the design and sizing of the modular silos 28 enables transport of individual modular silos 28 over public highways via trucks 36. When truck 36 and the corresponding modular silo 28 arrive at the well site 22, the truck 36 is used to back modular silo 28 into engagement with a first support connection of the support structure 50 on the mat system 52. For example, the first support connection of the support structure may include the pivot members 106. The modular silo 28 is moved toward support structure 50 until pivot members 106 of silo frame 56 engage corresponding pivot members 108 of support structure 50 to form pivot connectors 102. The pivot connectors 102 provide a connection between the modular silo 28 and the support structure 50 which allows the modular silo 28 to be securely erected in a controlled manner from a lateral, e.g. horizontal, position to an operational, upright position. By way of example, the hydraulic ram 104 depicted in FIG. 5 may be used to erect the modular silo 28 toward the upright position.

Trucks 36 are used to deliver subsequent modular silos 28 to support structure 50 until the desired number of modular silos 28 is positioned at the well site 22 as shown in FIG. 7. Each of the modular silos 28 is pivoted to the upright position on silo receiving regions 54 of support structure 50, as illustrated in FIG. 7. After the modular silos 28 are mounted upright on support structure 50, the modular silos 28 may be bolted or otherwise further secured to support structure 50. In some applications, the modular silos 28 also may be tied to each other to further stabilize the assembly. In the example illustrated, support structure 50 supports modular silos 28 at a sufficient height to receive a portable blending system 44 in the drive under region or passage 84. In this example, feeders of the modular silos 28 may be positioned to discharge the oilfield material into the passage 84. Additionally, enclosed conveyor systems 30 may be connected to the inlet hoppers 66 of vertical conveyors 32. At this stage, oilfield material 62 may be delivered to the well site 22 and loaded into modular silos 28 via conveyors 30 and vertical conveyors 32.

It should be noted that in some applications, the external conveyor or conveyors 30 have a section with an exposed belt which allows oilfield material to be unloaded via gravity from appropriately designed gravity feed trucks which are backed over the exposed belt. The oilfield material fed onto the belt is then conveyed into an enclosed section of the conveyor 30 and transported along an incline for release into at least one inlet 66 of a corresponding modular silo 28.

The arrangement and components of the proppant delivery system 20 may vary substantially depending on the parameters of a given fracturing operation. The modular silos 28 may be used individually or in groups of modular silos securely mounted on the support structure 50. The modular silos may be mounted at a sufficient height to direct outflowing oilfield material through an outflow feeder positioned at the bottom of the enclosed interior and into the passage 84. In other applications, the feeders may be positioned to direct outflow of oilfield material from a higher compartment within the modular silo 28. In some applications, the modular silos 28 may comprise an enclosed interior divided into a plurality of compartments for holding different types of oilfield material that may be selectively metered to the blender system 44 for blending into a desired mixture which is then pumped downhole into the wellbore.

Additionally, various belt conveyors or other types of conveyors may be enclosed to deliver oilfield material from the unload area to the upright, modular silos 28. The modular silos 28 also may incorporate a variety of vertical conveyors for lifting the oilfield material to an upper discharge region of the modular silos 28. Various arrangements of upright modular silos 28 enable storage of a substantial quantity of oilfield materials that may be readily supplied for use in a fracturing operation. The upright arrangement of modular silos 28 also provides for an efficient use of well site space. In addition to the space efficiency, the enclosed system for storing and delivering oilfield material provides a clean well site substantially free of dust production. However, depending on the specifics of a given fracturing operation, various numbers and arrangements of modular silos 28, conveyors 30 and 32, blending systems 44, and other well site equipment may be employed.

The support structure 50 and the mat system 52 also may be constructed in various forms and configurations depending on the parameters of the desired fracturing operation. For example, the support structure 50 may be constructed from many types of strut configurations, combinations of struts and other structural components, and/or structural walls or other devices to support the modular silos 28. In some applications, the support structure 50 may be constructed as an A-frame or truncated A-frame. The support structure 50 also may be constructed as a single connected unitary support structure or as a plurality of sub support structures which may be separated to accommodate separation of individual modular silos 28 and/or separation of groups of modular silos 28. Similarly, the mat system 52 may be constructed with a variety of materials and in a variety of configurations depending on the parameters of the fracturing operation and on the characteristics of the corresponding equipment, e.g. modular silos 28, blending systems 44, and other equipment which facilitate the hydraulic fracturing.

Figure 10:
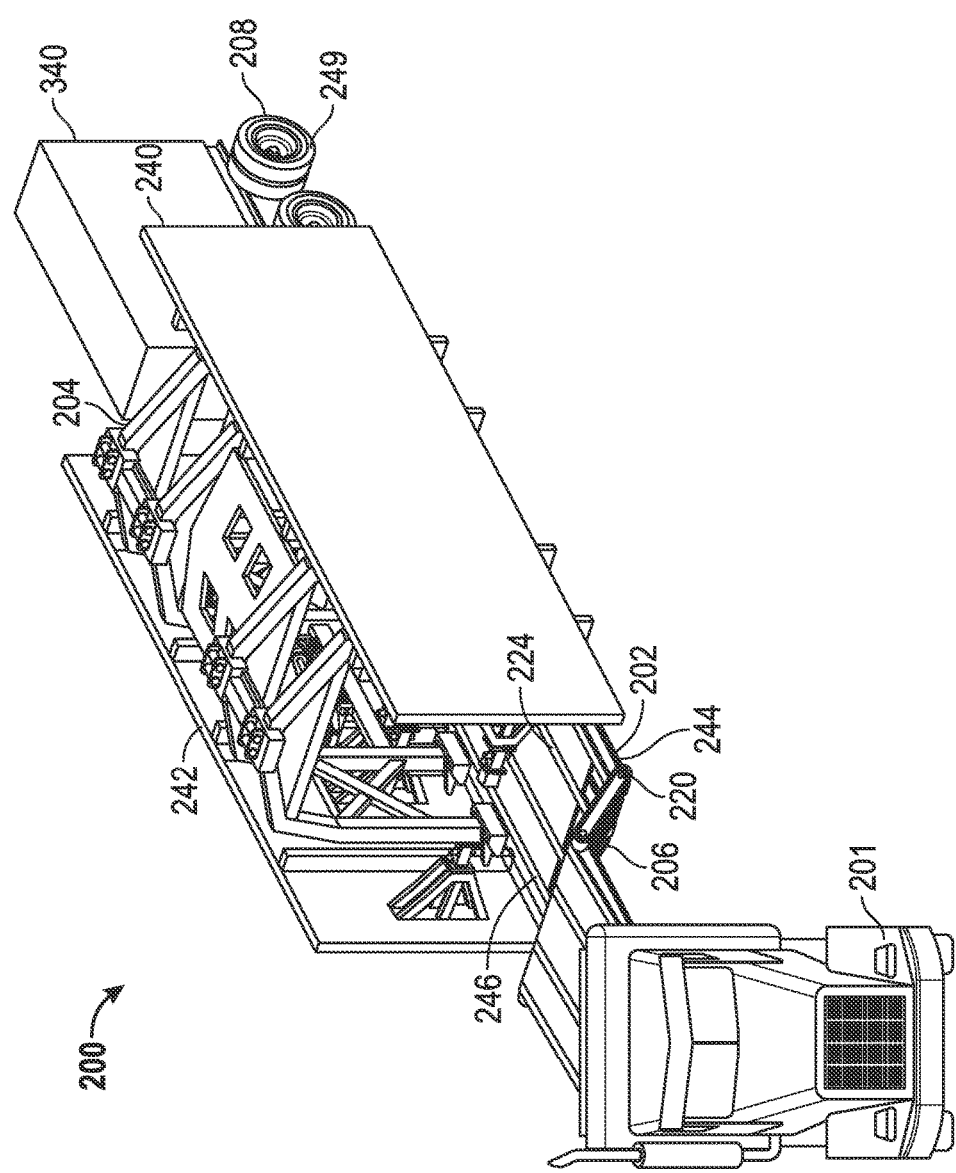
FIGS. 10-12 depict various illustrations of installing a mobile support structure at a location according to an embodiment of the disclosure.
Figure 11:
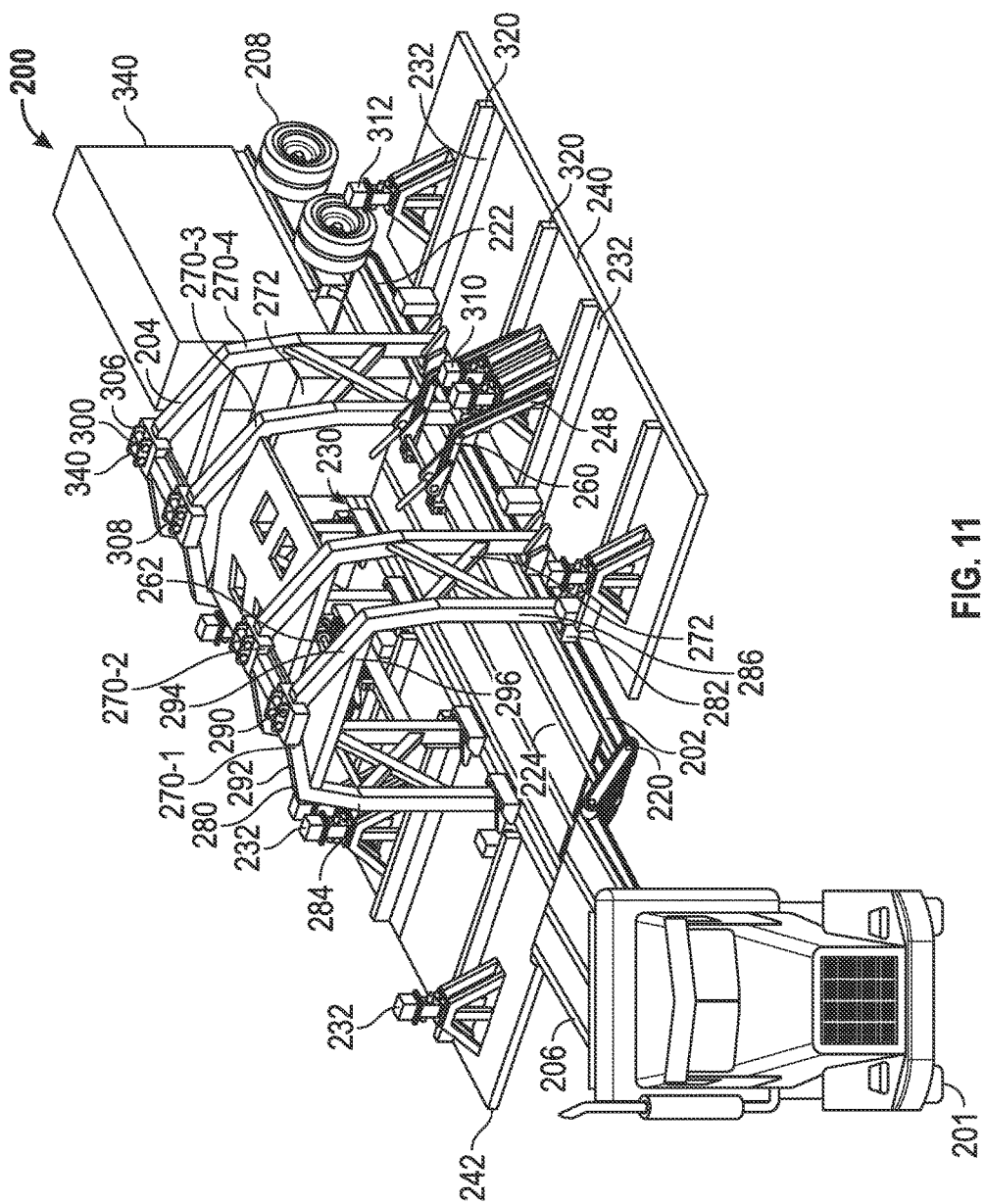
Figure 12:
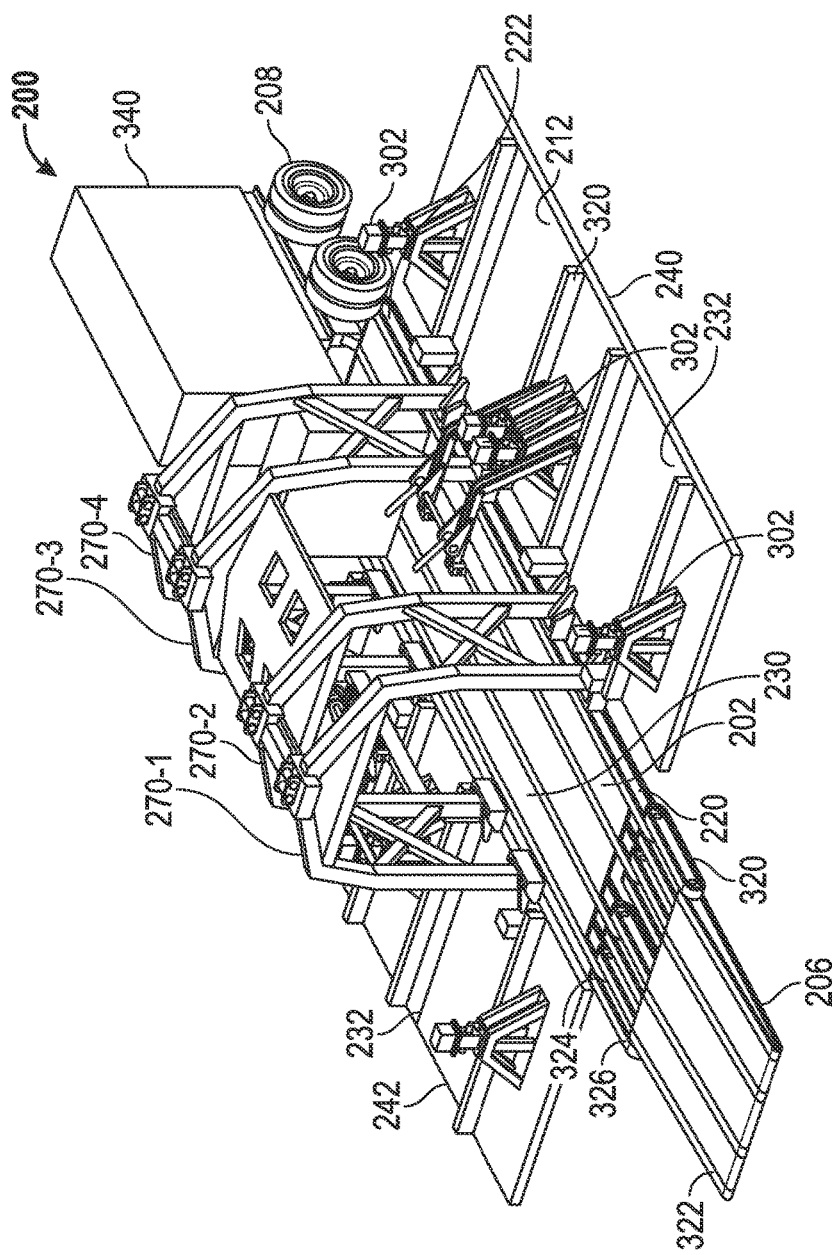

Shown in FIGS. 10-17, is a mobile support structure 200 for supporting one or more modular silos 28 in accordance with the present disclosure. FIG. 10 shows the mobile support structure 200 in a transport configuration in which the mobile support structure 200 is configured to be transported on roadways by being pulled behind a truck 201. FIG. 11, on the other hand, shows the mobile support structure 200 in the process of being converted into an operational configuration for supporting one or more of the modular silos 28 while attached to the truck 201. FIG. 12 shows the mobile support structure 200 in the operational configuration and detached from the truck 201. In general, the mobile support structure 200 may be designed to comply with various state and federal regulations for transport over the highways. In this regard, the mobile support structure 200 may have a width and a height of less than about 14 feet and a length less than 53 feet.

In the example shown, the mobile support structure 200 is provided with a support base 202, a frame structure 204, a gooseneck portion 206 and a plurality of wheels 208 for supporting the support base 202, the frame structure 204 and the gooseneck portion 206. The gooseneck portion 206 of the mobile support structure 200 can be attached to the truck 201 such that the truck 201 can move the mobile support structure 200 between various locations such as wellsites. As will be explained in more detail below, the mobile support structure 200 is designed to be transported to a wellsite, and then set up to support one or more of the modular silos 28. In the example shown, the mobile support structure 200 is designed to support up to four modular silos 28 (as shown in FIG. 1). However, it should be understood that the mobile support structure 200 can be designed to support more or less of the modular silos 28 depending upon state and federal regulations determining the size of the mobile support structure 200 as well as the width and/or size of the modular silos 28.

The support base 202 is provided with a first end 220, a second end 222, a top surface 224 and a bottom surface (not shown). The frame structure 204 is connected to the support base 202. The frame structure 204 extends above the support base 202 to define a passage 230 generally located between the top surface 224 and the frame structure 204. The frame structure 204 has at least one silo receiving region 232 sized and configured to receive at least one of the modular silo 28. In the example shown, the frame structure 204 has four silo receiving regions 232 with each of the silo receiving regions 232 designed to support one of the modular silos 28.

The gooseneck portion 206 extends from the first end 220 of the support base 202 and is configured to connect to the truck 210 as discussed above. The axles 208 can be located proximate to the second end 222 of the support base 202 as shown in FIG. 10, for example. In the example shown in FIG. 10, the mobile support structure 200 is provided with two axles. However, it should be understood that more than two axles can be used and positioned at various locations relative to the support base 202 to support the components of the mobile support structure 200.

As shown in FIG. 10, the mobile support structure 200 is also provided with a first expandable base 240 and a second expandable base 242 to provide further lateral support to the modular silos 28 to prevent the modular silos 28 from falling over. In the example shown, the support base 202 is provided with a first side 244 and a second side 246. The first expandable base 240 is positioned on the first side 244 of the support base 202 and the second expandable base 242 is positioned on the second side 246 of the support base 202.

The first and second expandable bases 240 and 242 may be movably connected to at least one of the frame structure 204 and the support base 202 via a mechanical linkage 248 so that the first and second expandable bases 240 and 242 may be selectively positioned between a travel position as shown in FIG. 10 and a support position as shown in FIG. 11. In the travel position shown in FIG. 10, the first and second expandable bases 240 and 242 extend substantially vertically and adjacent to the frame structure 204 so as to be within acceptable size limits for transporting the mobile support structure 200 on public roads and highways. However, in the support position shown in FIG. 11, the first and second expandable bases 240 and 242 extend substantially horizontally from the frame structure 204 to provide additional lateral support for the modular silos 28.

In one embodiment, the support base 202 is provided with a linkage (not shown) supported by the wheels 208 for moving the support base 202 in a vertical direction relative to the wheels 208 between a travel position in which the support base 202 is located above in a lower portion 249 of the wheels 208 (as shown in FIG. 10) and a support position in which the support base 202 is positioned on the ground and at least a portion of the support base 202 is aligned with the lower portion 249 of the wheels 208. When the support base 202 is positioned on the ground and the first and second expandable bases 240 and 242 are positioned in the support position, the support base 202 and the first and second expandable bases 240 and 242 may be coplanar. Further, the support base 202 and the first and second expandable bases 240 and 242 may be positioned on a pad to aid in stabilizing the support base 202 and the expandable bases on the ground at the wellsite prior to erecting the modular silos 28 onto the mobile support structure 200. The support base 202 may provide support to the one or more silos in sub-optimal ground surface conditions.

The mechanical linkage 248 movably connecting the frame structure 204 and/or support base 202 with the first and second expandable bases 240 and 242 can be implemented in a variety of manners. For example, the mechanical linkage 248 may be provided with a first set of hinges connecting the first expandable base 240 to the frame structure 204 and a second set of hinges connecting the second expandable base 242 to the frame structure 204. To automate the movement of the first and second expandable bases 240 and 242 between the support position and the travel position, the mechanical linkage 248 may be provided with a first set of actuators 260 and a second set of actuators 262. The first set of actuators 260 are connected to the frame structure 204 and the first expandable base 240. The second set of actuators 262 are connected to the frame structure 204 and the second expandable base 242. In general, the first set of actuators 260 and the second set of actuators 262 are configured to selectively move the first and second expandable bases 240 and 242 between the support position and the travel position. The first and second sets of actuators 260 and 262 can be constructed in a variety of manners and may include a hydraulic cylinder, a pneumatic cylinder, or a solenoid. In the example shown, the first set of actuators 260 is provided with two actuators and the second set of actuators 262 is also provided with two actuators. However, it should be understood that more or less actuators can be provided within the first and second set of actuators 260 and 262 depending upon the size of the actuators which are used.

Shown in FIG. 11 is a diagram of the mobile support structure 200 having the first and second expandable bases 240 and 242 positioned in the support position and showing the frame structure 204 more clearly than in FIG. 10. The frame structure 204 is provided with a plurality of frames 270 which are interconnected with a plurality of struts 272. In the example shown, the frame structure 204 is provided with four frames 270 (which are labeled in FIG. 11 with reference numerals 270-1, 270-2, 270-3 and 270-4. However, it should be understood that frame structure 204 may include more than four frames 270 or less than four frames 270. In the example shown, each of the frames 270 positioned in parallel and substantially identical in construction and function. For this reason, only one of the frames 270 will be described in detail hereinafter.

The frame 270-1, for example, is provided with a top member 280, a bottom member 282, and two side members 284 and 286 that are connected to form a closed structure surrounding at least a portion of the passage 230. The bottom member 282 is positioned within a passageway (not shown) extending through the support base 202 and is connected to the side members 284 and 286 to maintain the side members 284 and 286 a fixed distance apart. As shown in FIG. 11, the side members 284 and 286, and top member 280 may be shaped and connected to form an arch shape so as to increase the structural strength of the frame 270-1. The top member 280 is provided with an apex 290 which may be centrally located between the side members 284 and 286. The top member 280 includes a first leg 292 and a second leg 294 which are connected together at the apex 290. The first leg 292 is connected to the side member 284 and the second leg 294 is connected to the side member 286. The top member 280 may also be provided with a support beam 296 so as to increase the strength of the top member 280. In particular, the support beam 296 reinforces the first leg 292 and the second leg 294 to prevent the first leg 292 from deflecting relative to the second leg 294 and vice-versa when the modular silos 28 are being supported. The frame 270-1 can be made of any suitably strong and durable material to be able to support the load from the modular silos 28. For example, the top member 280, a bottom member 282, and two side members 284 and 286 may be constructed of pieces of tubular steel that are connected together using any suitable technique, such as mechanical fastening techniques utilizing combinations of bolts, plates and welds.

Figure 17:
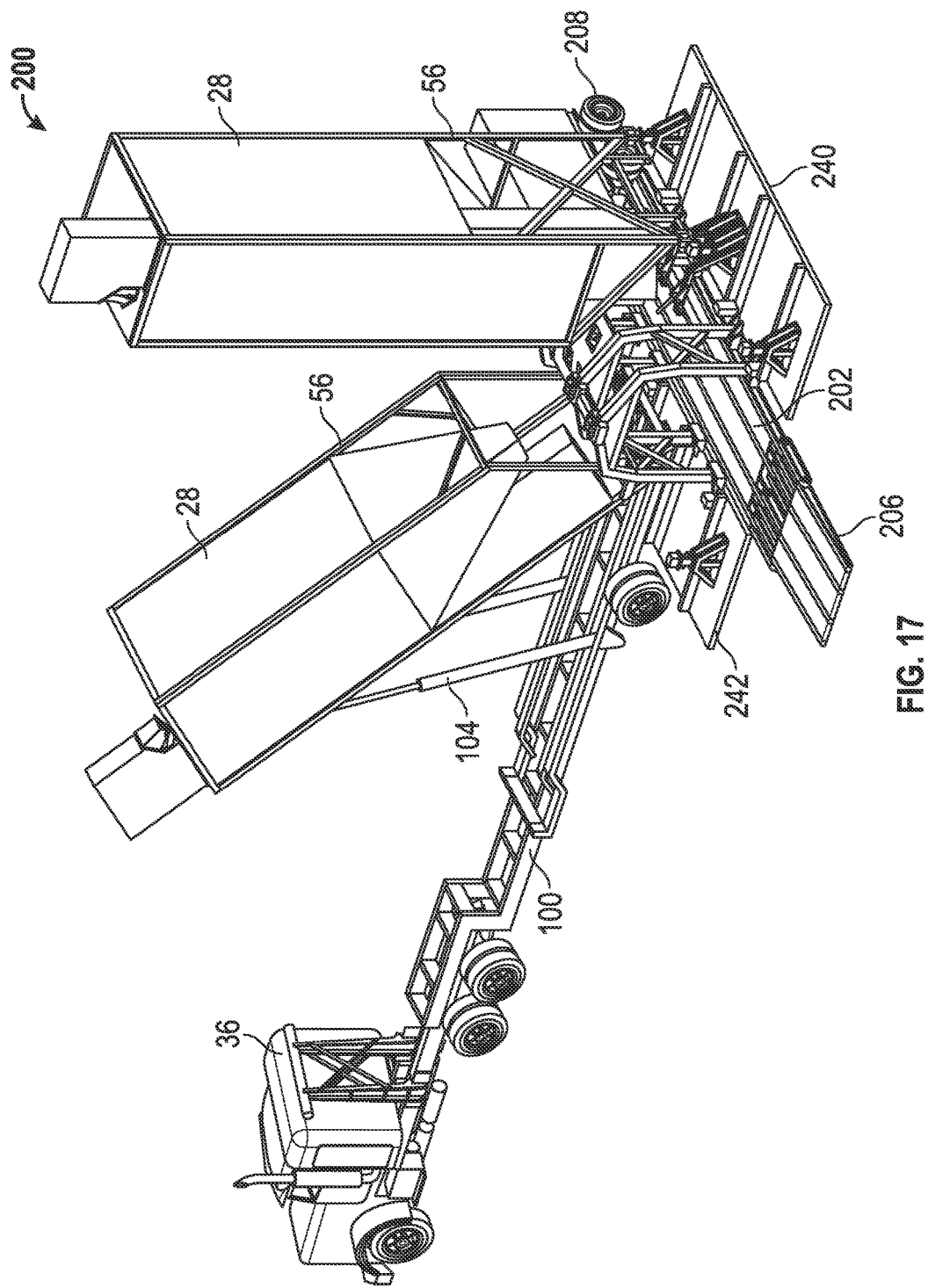

The frames 270-1 and 270-2 are connected by the struts 272 and are adapted to jointly support two modular silos 28. Likewise, the frames 270-3 and 270-4 are connected by the struts and are adapted to jointly support two modular silos 28 as shown in FIG. 17. In particular, the frames 270-1 and 270-2 form two silo receiving regions 232 of the mobile support structure 200, and the frames 270-3 and 270-4 form two other silo receiving regions 232. Within each of the silo receiving regions 232, the mobile support structure 200 is provided with a first connection 300 and a second connection 302. The first connection 300 within each of the silo receiving regions 232 is located at the apex 290 of the frames 270-1-4. The second connection 302 within each silo receiving region 232 is located on either the first expandable base 240 or the second expandable base 242 and at a lower elevation than the first connection 300 to engage the silo frame 56 when the modular silo 28 is on the trailer 37.

Figure 13:
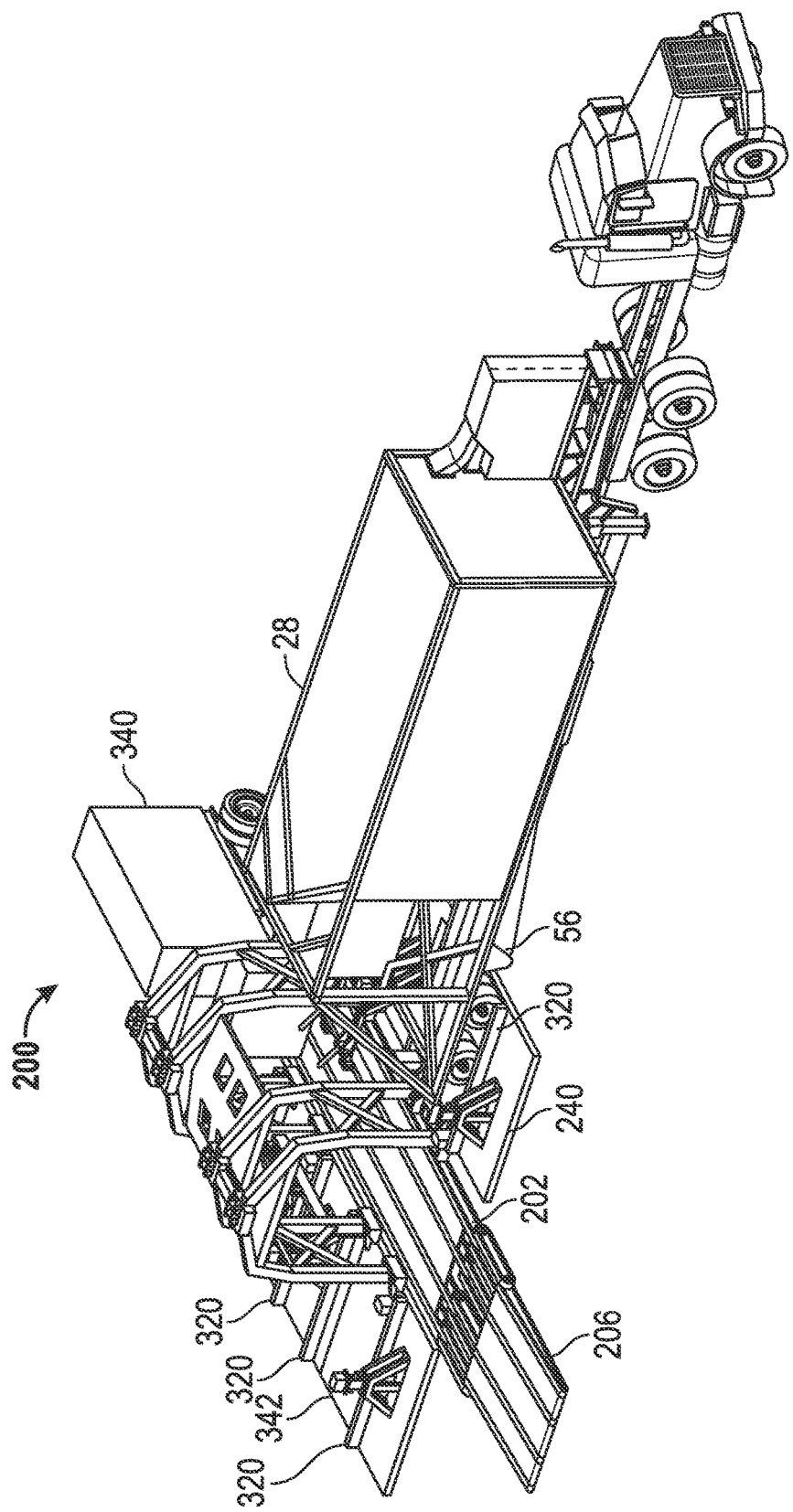
FIGS. 13-15 depict various illustrations of aligning a modular silo with connections of the mobile support structure at a location according to an embodiment of the disclosure.
Figure 14:
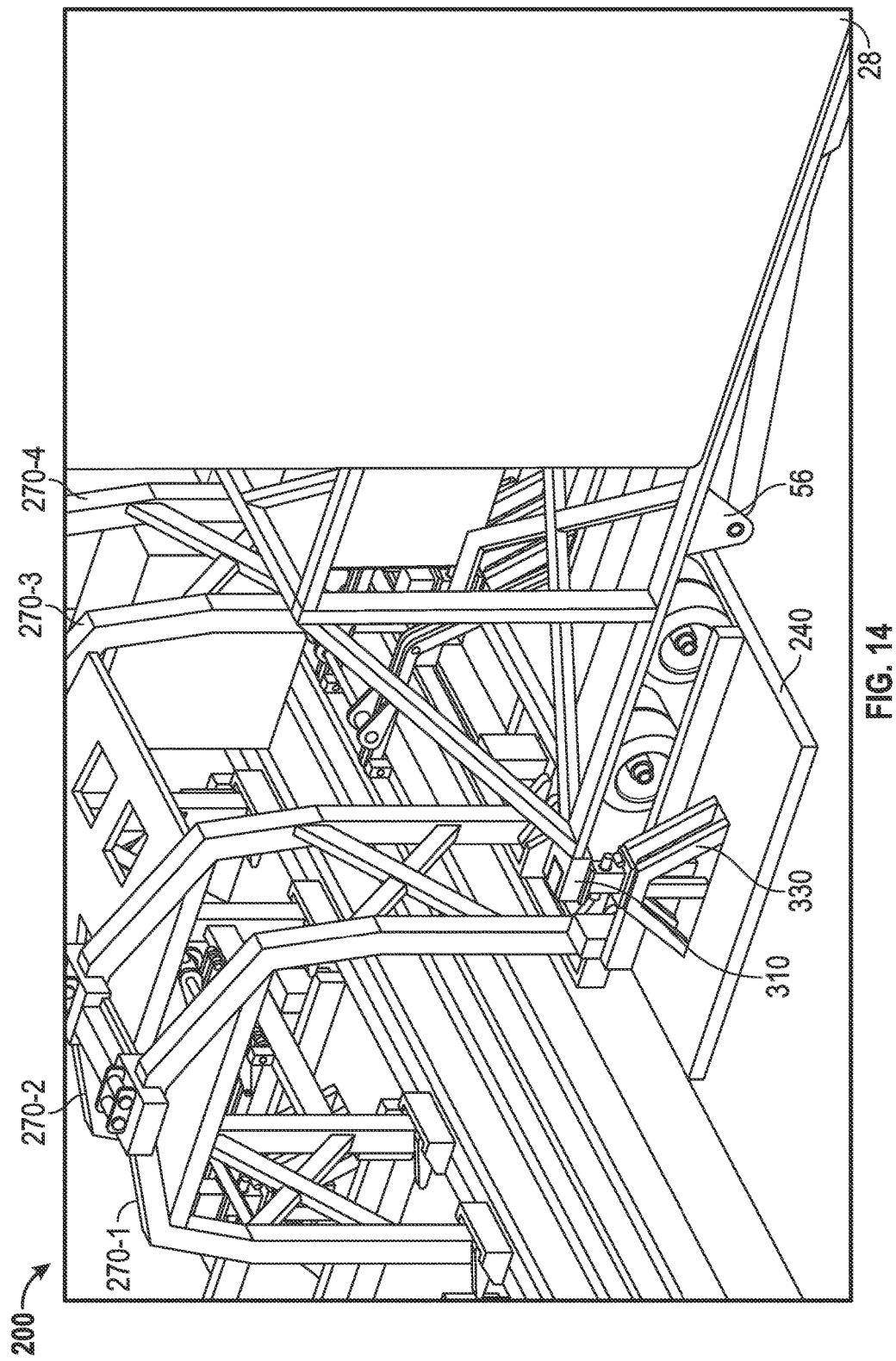

The first connection 300 within each of the silo receiving regions 232 includes a first connector 306 and a second connector 308 that are configured to attach to the silo frame 56 of the modular silos 28. The second connection 302 within each of the silo receiving regions 232 includes a first connector 310 and a second connector 312 that are configured to attach to the silo frame 56 of the modular silos 28. The first connector 310 and the second connector 312 of the second connection 302 are configured to connect to the silo frame 56 of the modular silo 28 when the modular silo 28 is positioned on the trailer 37 as discussed above. For example, as shown in FIG. 13, the trailer 37 can be backed to align the silo frame 56 with the first connector 310 and the second connector 312 of the second connection 302. As shown in FIGS. 13 and 14, to aid in backing the trailer 37 to align the silo frame 56 with the first connector 310 and the second connector 312 of the second connection 302, alignment guides 320 may be provided on the first expandable base 240 and the second expandable base 242 within each of the silo receiving regions 232.

In any event, once the silo frame 56 of the modular silo 28 to be erected onto the mobile support structure 200 is connected to the second connection 302, the modular silo 28 may be moved into the vertical position as discussed above using a ram, crane or other suitable mechanical assembly. When the modular silo 28 is in the vertical position, the silo frame 56 is connected to the frame structure 204 via the first connection 300 to maintain the modular silo 28 securely on the mobile support structure 200.

Once the support base 202 and the first and second expandable bases 240 and 242 have been deployed to the support position, the truck 201 can be disconnected from the gooseneck portion 206 of the mobile support structure 200. Once the truck 201 has been disconnected, the gooseneck portion 206 may be manipulated to lie on the ground and be generally co-planar with the support base 202. In this configuration, the gooseneck portion 206 may form a ramp to aid the operator in positioning the blending system 44 within the passage 230 as shown in FIG. 1. The gooseneck portion 206 may be provided with a first section 320 and a second section 322. The first section 320 extends from the first end 220 of the support base 202. The first section 320 has a first end 324 and a second end 326. The first end 324 of the first section 320 is movably connected to the support base 208, such as by the use of a set of hinges, voids and pins or other types of connectors which may be locked at more than one position. The second section 322 is movably connected to the second end 326 of the first section 320. For example, the first section 320 may be a four bar linkage which can be locked in an elevated position to form the gooseneck, or a lowered position to form the ramp Shown in FIG. 12 is the mobile support structure 200 in the operational configuration. In the operational configuration depicted in FIG. 12, the modular silos 28 can be loaded onto the mobile support structure 200, as shown for example, in FIGS. 1 and 13-17, and the blending system 44 can be positioned within the passage 230.

Shown in FIGS. 13-17 is an example in which a modular silo 28 is being placed into position on the mobile support structure 200. In this example, each individual modular silo 28 is transported to the well site 22 by the truck 36. As illustrated, the truck 36 may comprise the tractor 98 pulling the trailer 100 appropriately sized to receive one of the silos 28 in a lateral, e.g. horizontal, orientation.

Each truck 36 may be backed up to move the laterally positioned modular silo 28 into engagement with a corresponding silo receiving region 232 of the mobile support structure 200. Additional guide rails may be designed into the first and second expandable bases 240 and 242 to aid in the alignment of the silo trailer to the silo receiving region 232. Furthermore to aid in the proper alignment, the first and second expandable bases 240 and 242 may also serve as a reference elevation for the silo trailer.

As discussed above, the mobile support structure 200 may comprise the second connection 302 or other suitable structures located at an appropriate height to receive and engage each modular silo 28 when in the lateral position on the truck 36. By way of example, the mobile support structure 200 and the corresponding modular silos 28 may use the first and second connectors 310 and 312 by which the modular silo 28 may be selectively engaged with the mobile support structure 200. The first and second connectors 310 and 312 may be pivot connectors that are positioned to allow engagement and connection of each modular silo 28 with the mobile support structure 200 while the modular silo 28 is in a lateral position on the truck 36. The first and second connectors 310 and 312 also are designed to maintain engagement of the modular silo 28 with the mobile support structure 200 as the modular silo 28 is pivoted from the lateral position to an operational upright, e.g. vertical, orientation.

The modular silos 28 may be pivoted or moved about the first and second connectors 310 and 312 from the lateral position on the truck 36 to the operational, upright position on the support frame 204 of the mobile support structure 200 by a variety of mechanisms. For example, the ram 104 may be used to erect each modular silo 28 between the lateral and upright positions. The ram 104 may be a hydraulic or pneumatic ram positioned on trailer 100 to act against frame 56 of each modular silo 28 to pivot the modular silo 28 about the first and second connectors 310 and 312 until the modular silo 28 is securely received in its upright position by the silo receiving region 232. The ram 104 may be designed to operate off a hydraulic (or pneumatic) system of the truck 36. In other applications, the ram 104 may be designed to pivot the trailer 100 or a portion of the trailer 100 upwardly while the modular silo 28 remains attached to the pivoting portion of the trailer 100. Other techniques may utilize cranes, pulleys, and/or other mechanisms to pivot each modular silo 28 about the first and second connectors 310 and 312 as the modular silo 28 is transitioned from the lateral position to the operational, upright orientation.

Figure 15:
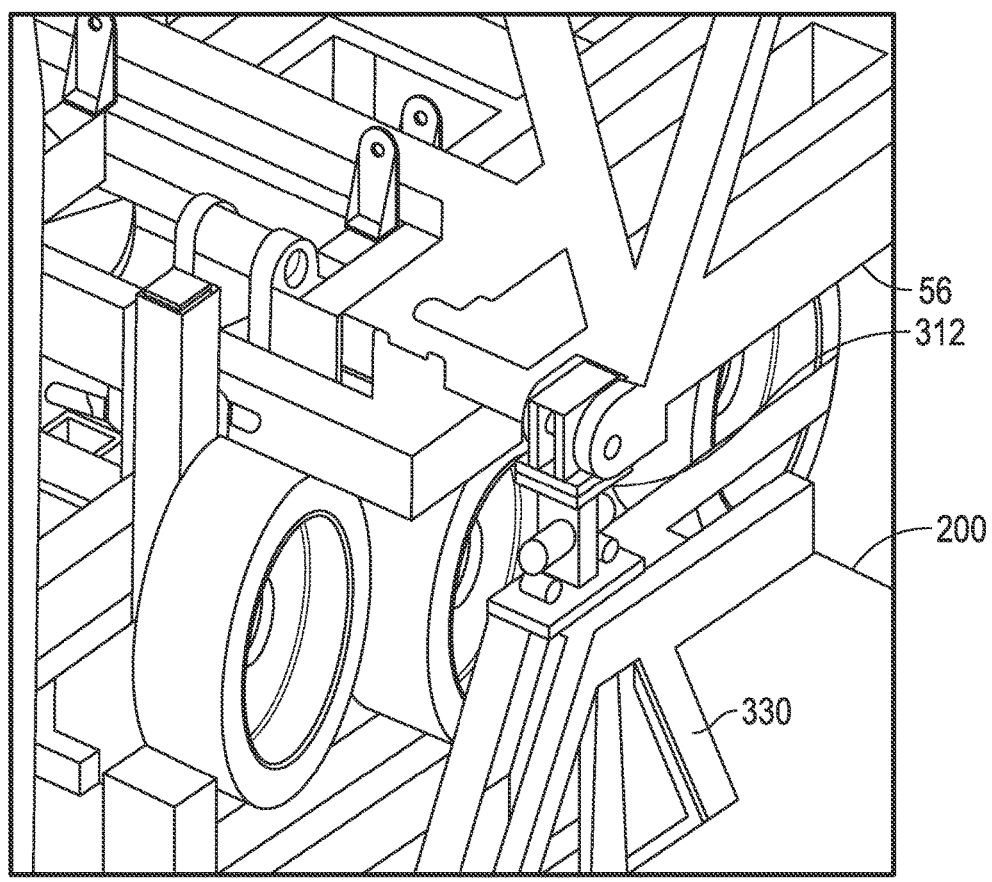
Figure 16:
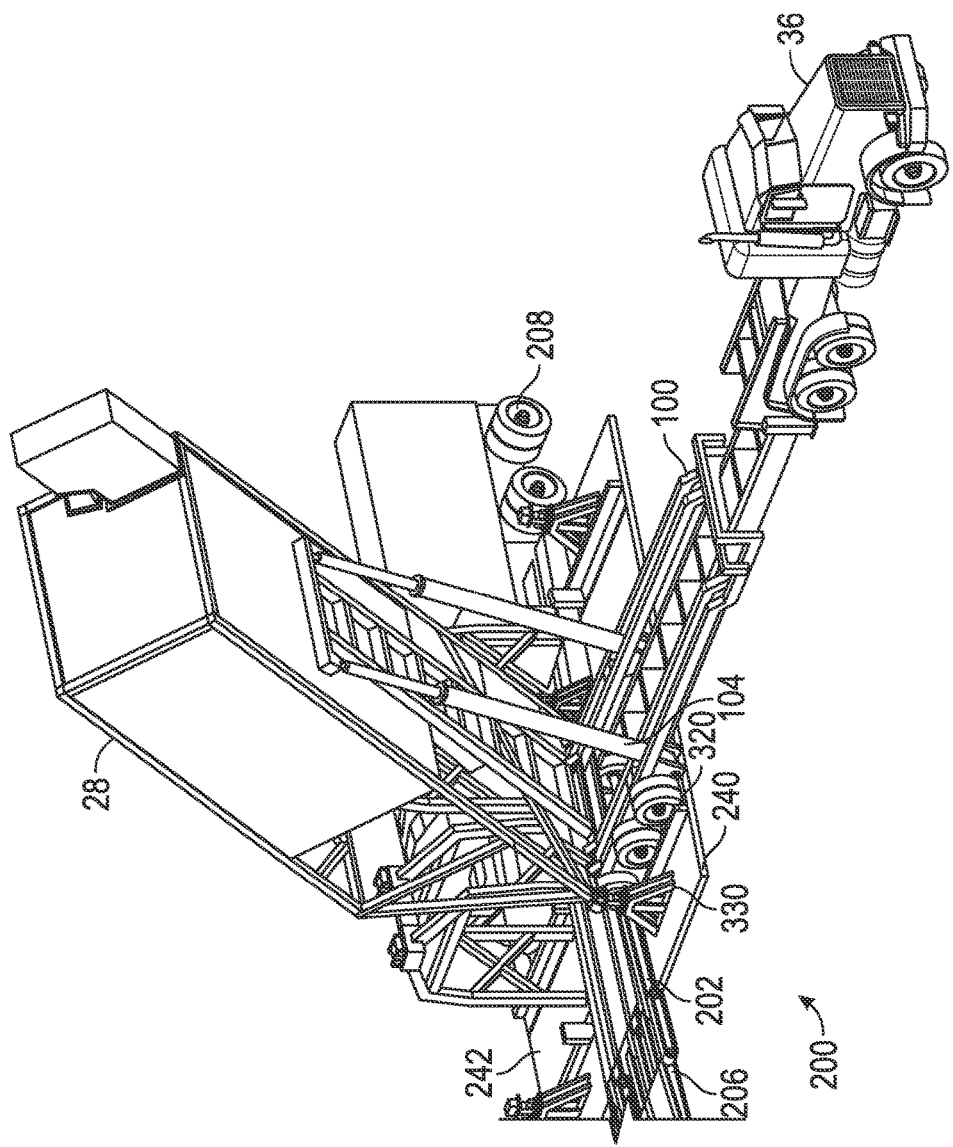
FIGS. 16-17 depict various illustrations of erecting the modular silos onto the mobile support structure according to an embodiment of the disclosure.

The first and second connectors 310 and 312 are shown in more detail in FIGS. 14 and 15. The first and second connectors 310 and 312 are used to facilitate formation of the connection between each modular silo 28 and the mobile support structure 200 and may comprise a variety of individual or plural connector mechanisms. Generally, each of the first and second connectors 310 and 312 are designed to permit controlled movement of the modular silo 28 relative to the mobile support structure 200. The first and second connectors 310 and 312 may comprise a pivot member mounted to the silo 28 and a corresponding pivot member mounted on the mobile support structure 200, e.g. mounted on struts 330, as illustrated in FIGS. 14 and 15. In the specific example illustrated in FIGS. 14 and 15, each modular silo 28 is pivotably engaged with the mobile support structure 200 via a pair of the pivot members. By way of example, each pivot member may comprise a pin rotatably, e.g. pivotably, received in a corresponding pin receiver of the pivot member. Although pin may be connected to frame 56 of modular silo 28 and pin receiver may be connected to pivot struts 330 of support structure 50, the pin and the pin receiver can be reversed. Additionally, the first and second connectors 310 and 312 may comprise a variety of other structures designed to enable selective engagement of the modular silos 28 with the mobile support structure 200 and controlled movement of the modular silos 28 with respect to the mobile support structure 200. Depending on the design of the first and second connectors 310 and 312, a variety of retention features such as an expanded pin head may be used to maintain the pivotable connection between the modular silo 28 and the mobile support structure 200 during transition of the modular silo 28 from the lateral position to the upright position.

The mobile support structure 200 may also be provided with other types of equipment to facilitate the handling of the oilfield material and/or the blending of the oilfield material to form the slurry as discussed above. For example, the mobile support structure 200 may be provided with a power generation system 340 that is supported by the wheels 208. In this embodiment, the power generation system 340 may be utilized to generate electrical power which may be provided to the conveyors 30 and 32 as well as other equipment at the proppant delivery system 20. The mobile support structure 200 may also be provided with a dry additives feeder, power sources, controls and controllers, a skid for supporting a blender system integrated into the support base 202. Further, the mobile support structure 200 may be provided with weather proofing to protect from the harsh environmental conditions. Further, the mobile support structure 200 may be provided with various sensors 116 positioned on the frame structure 204 and/or on modular silos 28 to detect and/or monitor parameters related to the delivery of oilfield material 62 for a given fracturing operation. By way of example, the sensors 116 may comprise four load cells in each silo receiving region 232 and may be part of the connectors 306, 308, 310 and 312 to monitor the loads applied by individual modular silos 28. The loading data may be used to track the amount of oilfield material that remains in enclosed interior 60 of each modular silo 28 for inventory management purposes.

Figure 18:
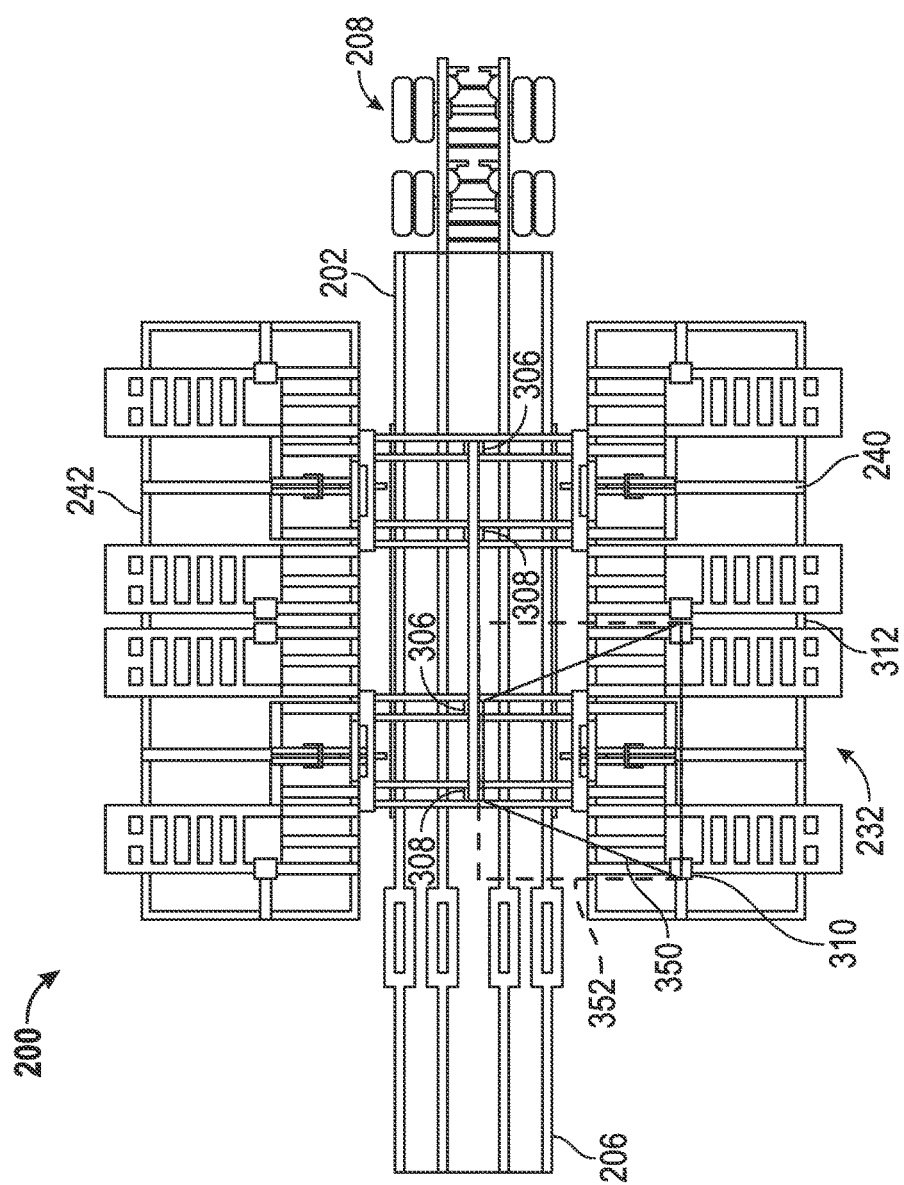
FIG. 18 is a top plan view of the exemplary mobile support structure depicted in FIGS. 10-17.

Shown in FIG. 18 is a top plan view of the mobile support structure 200. The connectors 306, 308, 310 and 312 may be arranged in a truncated triangle configuration 350, such as a trapezoid to enhance the stability of the modular silo 28 supported within the silo receiving region 232. Further, to aid in the support of the modular silo 28, the combined horizontal area of the support base 202, first expandable base 240 and second expandable base 242 is much larger than the horizontal area occupied by one of the modular silos 28 when installed on the mobile support structure 200. For example, a first horizontal area 352 occupied by one of the modular silos 28 when positioned in a vertical orientation is shown in FIG. 18. As can be seen, the support base 202, first expandable base 240 and the second expandable base 242 occupy a combined second horizontal area that is at least one and a half times as large as the first horizontal area 352 and may be eight or ten times as large as the first horizontal area 352.

Figure 19:
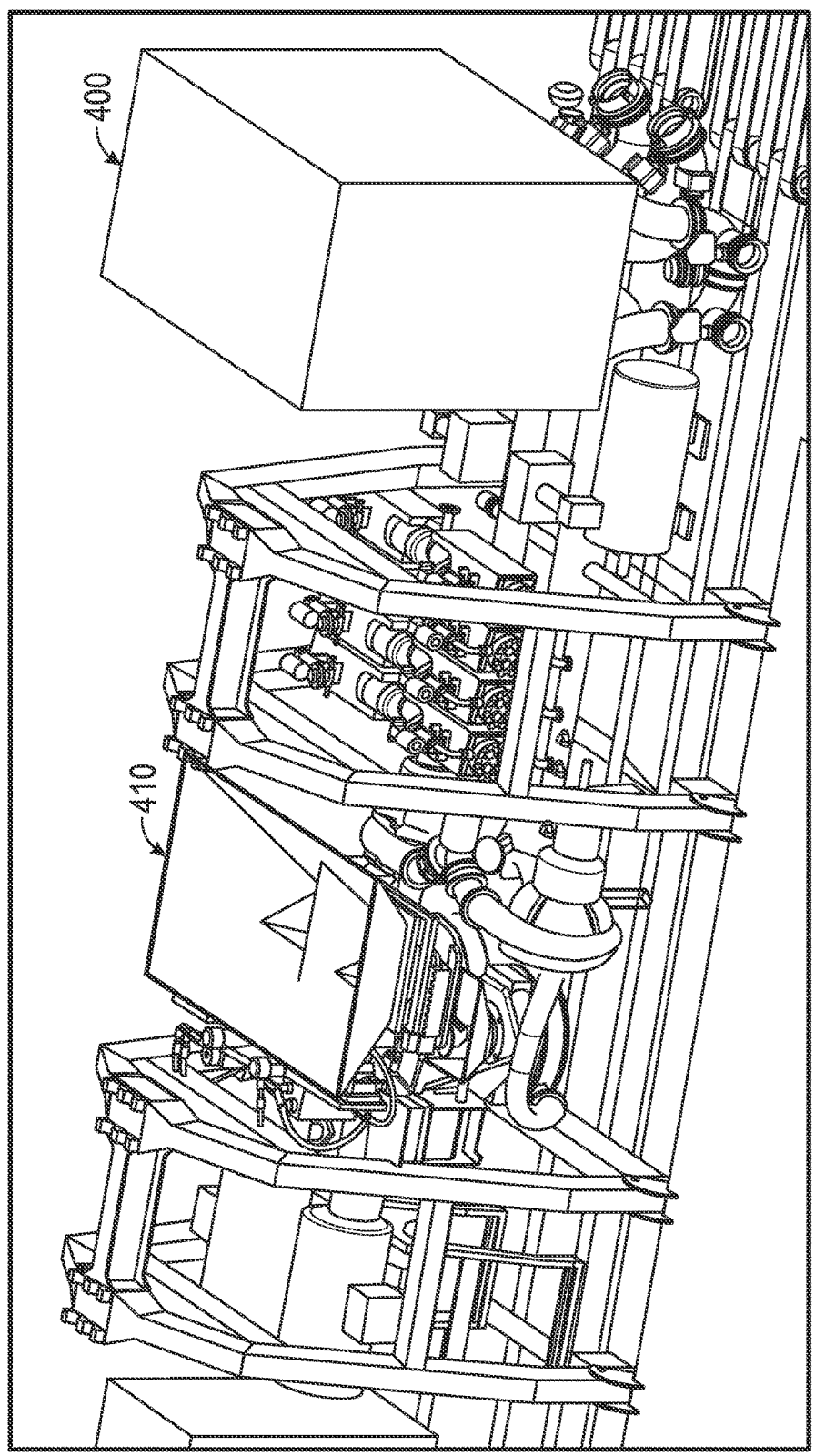
FIG. 19 is a perspective view of another embodiment of a mobile support structure constructed in accordance with the present disclosure having a blending system integrated into a support base of the mobile support structure and within a passage defined by a frame structure.

Shown in FIG. 19 is a second embodiment of a mobile portable structure 400, which is similar in construction and function as the mobile portable structure 200, with the exception that the mobile portable structure 400 has an integrated blending system 410. The integrated blending system may be transported with the other components of the mobile portable structure 400 and provided on skids or tracks to be moved off of a support base 412 of the mobile portable structure 400.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:
1. A method, comprising:
providing a silo with an enclosed interior for holding an oilfield material;
positioning the silo in a lateral position on a trailer;
backing the trailer toward a support structure to engage a portion of the support structure with a portion of the silo,
connecting the silo and the support structure together via a first connection while the silo is in the lateral position;
erecting the silo from the lateral position to an upright position on the support structure while the silo and the support structure are connected, the silo, in the upright position and the support structure defining a passage thereunder;

at least partially filling the silo with the oilfield material; and moving a portable blending system into the passage defined by the silo and the support structure, wherein the support structure defines the height of the passageway prior to connecting the silo.

2. The method as recited in claim 1, wherein the support structure defines a plurality of silo receiving areas designed to support at least two silos in an upright position; and further comprising repeating providing, positioning, backing, connecting, erecting, and at least partially filling for each of the at least two silos.

3. The method as recited in claim 1, further comprising locating load cells on the support structure to measure the amount of oilfield material in the silo.

4. The method as recited in claim 1, wherein the first connection comprises a pivot connection formed with a plurality of pins received in a plurality of pin receivers.

5. The method as recited in claim 1, further comprising using expandable bases on the support structure to stabilize the silo.

6. The method as recited in claim 1, wherein providing comprises enclosing a vertical conveyor in the enclosed interior to lift proppant related material from a lower end of the silo to an upper discharge end of the silo.

7. The method as recited in claim 1, wherein erecting comprises pivoting the silo from the trailer into a desired configuration on the support structure.

8. The method as recited in claim 1 further comprising providing alignment guides on the support structure for aligning the trailer while backing the trailer toward the support structure.

9. The method as recited in claim 1, wherein providing comprises providing the silo with a supporting silo frame.

10. The method as recited in claim 9, wherein the silo frame supports an outer housing of the silo.

11. The method as recited in claim 1, wherein the first connection comprises pivot connectors positioned to allow engagement and connection of the silo with the support structure while the silo is in the lateral position.

12. The method as recited in claim 1, further comprising performing a fracturing operation and utilizing the silo and the portable blending system to provide oilfield material for the fracturing operation.

13. The method as recited in claim 1, wherein the support structure comprises a support frame integrated into a trailer chassis.

14. The method as recited in claim 13, wherein the support structure comprises a support base underneath the support frame, the support base having a first side and a second side, and wherein the support structure further comprises a first expandable base on the first side of the support base, and a second expandable base on the second side of the support base.

15. The method as recited in claim 1, wherein the support structure comprises a base, and wherein the first connection comprises a plurality of first pivot members mounted on the base.

16. The method as recited in claim 15, wherein the first connection comprises a plurality of second pivot members positioned at a rear of a trailer for transporting the silo, and wherein the plurality of first pivot members of the first connection are mounted on the support structure at a height which enables engagement with the plurality of second pivot members of the first connection when the silo is in the lateral position on the trailer.

17. The method as recited in claim 1, wherein the support structure holds the silo above the blending system such that the silo overlaps at least a portion of the blending system.

18. The method as recited in claim 17, wherein the support structure holds the silo at a sufficient height in the upright orientation to enable the portable blending system to be positioned in the passage during unloading of the oilfield material from the silo.

19. The method as recited in claim 17, wherein the support structure includes a support base, and wherein the blending system is integrated into and supported by the support base.

20. The method as recited in claim 1, wherein the support structure has a second connection spaced a distance from the first connection, and wherein the silo has a silo connection configured to connect with a support connection when the silo is in the upright orientation.

21. The method as recited in claim 20, wherein the support structure has a base, and wherein the first and second connections are connected to the base, and wherein the silo and the support connections have different elevations relative to the base.

* * * * *